United States Patent
Jeong et al.

(10) Patent No.: US 12,255,354 B2
(45) Date of Patent: *Mar. 18, 2025

(54) SEPARATOR FOR LITHIUM SECONDARY BATTERY WITH IMPROVED ADHESIVENESS TOWARDS ELECTRODE AND RESISTANCE CHARACTERISTICS AND LITHIUM SECONDARY BATTERY COMPRISING THE SEPARATOR

(71) Applicant: LG ENERGY SOLUTION, LTD., Seoul (KR)

(72) Inventors: So-Mi Jeong, Daejeon (KR); Dong-Wook Sung, Daejeon (KR); Dae-Sung Jang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/372,682

(22) Filed: Sep. 25, 2023

(65) Prior Publication Data

US 2024/0021960 A1  Jan. 18, 2024

Related U.S. Application Data

(63) Continuation of application No. 17/044,364, filed as application No. PCT/KR2019/012770 on Sep. 30, 2019, now Pat. No. 11,811,093.

(30) Foreign Application Priority Data

Sep. 28, 2018 (KR) .................. 10-2018-0116543

(51) Int. Cl.
H01M 50/489 (2021.01)
H01M 10/052 (2010.01)
(Continued)

(52) U.S. Cl.
CPC ....... H01M 50/489 (2021.01); H01M 10/052 (2013.01); H01M 50/426 (2021.01); H01M 50/449 (2021.01)

(58) Field of Classification Search
CPC .......... H01M 50/426; H01M 10/0565; H01M 50/417; H01M 50/446; H01M 50/451; H01M 50/457; H01M 4/623
See application file for complete search history.

(56) References Cited

U.S. PATENT DOCUMENTS 6,534,219 B1 * 3/2003 Iijima ............... H01M 10/0436
429/316
9,634,309 B2   4/2017 Park et al.
(Continued)

FOREIGN PATENT DOCUMENTS

CN        102349177 A  *  2/2012  ......... B29C 48/0018
JP     2007-317675 A      12/2007
(Continued)

OTHER PUBLICATIONS

Extended European Search Report issued from the European Patent Office dated Apr. 29, 2021 in corresponding European Patent Application No. 19866774.3.
(Continued)

Primary Examiner — Imran Akram
(74) Attorney, Agent, or Firm — Morgan, Lewis & Bockius LLP

(57) ABSTRACT

The present disclosure relates to a separator for a lithium secondary battery comprising a porous substrate, and a porous coating layer disposed on at least one surface of the porous substrate and comprising inorganic particles and binder polymer, wherein the binder polymer is terpolymer including 65 to 90 weight % of a repeat unit derived from vinylidenefluoride (VDF), 1 to 28 weight % of a repeat unit derived from hexafluoropropylene (HFP) and 5 to 28 weight
(Continued)

% of a repeat unit derived from chlorotrifluoroethylene (CTFE), and the separator has adhesiveness towards electrode ranging from 30 gf/25 mm to 150 gf/25 mm and machine direction (MD) thermal shrinkage of 1 to 18% and transverse direction (TD) thermal shrinkage of 1 to 17%, and a lithium secondary battery comprising the same, wherein the separator has uniform micropores on the surface, and thus has the increased adhesive surface area with electrode and consequential improved adhesiveness towards electrode.

16 Claims, 21 Drawing Sheets

(51) Int. Cl.
*H01M 50/426* (2021.01)
*H01M 50/449* (2021.01)

(56) References Cited

U.S. PATENT DOCUMENTS

| | | | |
|---|---|---|---|
| 2002/0009649 A1* | 1/2002 | Sato | H01M 10/0565 |
| | | | 29/623.5 |
| 2002/0197413 A1 | 12/2002 | Daido et al. | |
| 2003/0003363 A1 | 1/2003 | Daido et al. | |
| 2003/0157410 A1 | 8/2003 | Jarvis et al. | |
| 2003/0176608 A1 | 9/2003 | Lannuzel et al. | |
| 2005/0079406 A1 | 4/2005 | Daido et al. | |
| 2006/0134525 A1 | 6/2006 | Kleijnen et al. | |
| 2012/0121967 A1 | 5/2012 | Nakamura et al. | |
| 2012/0301794 A1 | 11/2012 | Koh et al. | |
| 2012/0321911 A1 | 12/2012 | Watanabe et al. | |
| 2013/0011716 A1* | 1/2013 | Sano | H01M 50/581 |
| | | | 521/27 |
| 2014/0315080 A1 | 10/2014 | Abusleme et al. | |
| 2015/0340676 A1 | 11/2015 | Schmidhauser et al. | |
| 2016/0079582 A1 | 3/2016 | Takeuchi et al. | |
| 2016/0093876 A1* | 3/2016 | Atwater | H01M 4/505 |
| | | | 429/224 |
| 2016/0164060 A1 | 6/2016 | Zhang et al. | |
| 2016/0289439 A1 | 10/2016 | Nagasawa et al. | |
| 2018/0123106 A1 | 5/2018 | Shin et al. | |
| 2018/0331342 A1 | 11/2018 | Honda et al. | |
| 2019/0013504 A1 | 1/2019 | Choi et al. | |

FOREIGN PATENT DOCUMENTS

| | | |
|---|---|---|
| JP | 6171117 B1 | 7/2017 |
| KR | 10-2003-0051606 A | 6/2003 |
| KR | 10-2012-0136355 A | 12/2012 |
| KR | 10-2015-0063870 A | 6/2015 |
| KR | 10-2017-0024574 A | 3/2017 |
| KR | 10-2017-0085825 A | 7/2017 |
| KR | 10-2017-0091149 A | 8/2017 |
| WO | 2018/066968 A1 | 4/2018 |

OTHER PUBLICATIONS

Dent, Thomas, "GPC/SEC Practical Tips and Tricks", Oct. 1, 2011 (Oct. 1, 2011). Retrieved from the Internet : URL:https://www.agilent.com/cs/library/slidepresentation/Public/GCC2011-Wksp_GPC_Tips-and-Tricks_Presentation. [retrieved on Jul. 24, 2019].

Ghosh, Premamoy: "Polymer Science Fundamentals of Polymer Science Molecular Weights of Polymers Contents Introduction Concept of Average Molecular Weight Number Average Molecular Weight Membrane Osmometry Weight Average Molecular Weight Assessment of Shape of Polymer Molecules Viscosity Average Molecular Weight Gener", Sep. 21, 2006 (Sep. 21, 2006), Retrieved from the Internet: URL:http://nsdl.niscair.res.in/jspui/bitstream/123456789/406/2/Molecular%20weights%20of%20polymers.pdf.

Jarvis, "The use of novel VDF-HFP-CTFE terpolymers in lithium-ion polymer cells," 2003 Elsevier, 119-121, 465-468 (2003).

Kim et al., "Lithium-Ion Cells Assembled with Flexible Hybrid Membrane Containing Li+-Conducting Lithium Aluminum Germanium Phosphate," Journal of the Electrochemical Society, 163 (6) A974-A980 (2016).

International Search Report (with partial translation) and Written Opinion issued in corresponding International Patent Application No. PCT/KR2019/012770, dated Jan. 22, 2020.

* cited by examiner

FIG. 7

| | | | Example 1 | Example 2 | Example 3 | Example 4 | Example 5 | Comparative example 1 | Comparative example 2 | Comparative example 3 | Comparative example 4 | Comparative example 5 | Comparative example 6 | Comparative example 7 | Comparative example 8 | Comparative example 9 |
|---|---|---|---|---|---|---|---|---|---|---|---|---|---|---|---|---|
| Binder polymer type | | | Terpolymer | Terpolymer | Terpolymer | Terpolymer | Terpolymer | Copolymer mixture | Copolymer | Copolymer | Copolymer | Terpolymer | Terpolymer | Terpolymer | Terpolymer | Terpolymer |
| PVDF-HFP-CTFE | VDF | | 90 | 80 | 74 | 80 | 80 | | | | | 70 | 90 | 80 | 90 | 66 |
| | HFP | | 5 | 1 | 1 | 10 | 15 | | | | | 1 | 5 | 1 | 5 | 29 |
| | CTFE | | 5 | 19 | 26 | 10 | 5 | | | | | 29 | 5 | 19 | 5 | 5 |
| PVDF-HFP | | | - | - | - | - | - | 15 | 15 | 8 | - | - | - | - | - | - |
| PVDF-CTFE | | | - | - | - | - | - | 20 | - | - | 20 | - | - | - | - | - |
| Binder migration condition | | | Wet phase separation | Wet phase separation | Wet phase separation | Wet phase separation | Wet phase separation | Wet phase separation | Wet phase separation | Wet phase separation | Wet phase separation | Wet phase separation | Immersion phase separation | Immersion phase separation | Low wet condition coating | Wet phase separation |
| Total thickness of separator [μm] | | | 18.8 | 18.5 | 18.5 | 18.3 | 17.9 | 18.2 | 17.9 | 18.5 | 17 | 17.5 | 20.1 | 19.5 | 16.2 | 16.9 |
| Coating loading amount [g/m2] | | | 13.9 | 13.8 | 13.8 | 13.7 | 13.5 | 13.6 | 13.7 | 13.5 | 13.9 | 13.8 | 13.5 | 13.4 | 13.7 | 13.3 |
| Air permeability [sec/100 ml] | | | 486 | 435 | 466 | 634 | 688 | 1447 | 1474 | 523 | 468 | 479 | 432 | 426 | 1652 | 1821 |
| Negative electrode-separator adhesiveness [gf/25mm] | | | 81 | 92 | 89 | 73 | 66 | 66 | 57 | 43 (Separation of substrate and porous coating layer due to insufficient adhesiveness) | 24 | 21 | 13 | 18 | 2 | 14 |
| Electrical resistance [Ω] | | | 0.85 | 0.82 | 0.85 | 0.93 | 0.96 | 1.07 | 1.25 | 0.98 | 0.91 | 0.92 | 0.92 | 0.82 | 1.2 | 1.73 |
| Thermal shrinkage [%] | MD | | 9 | 8 | 8 | 17 | 16 | 15 | 21 | 18 | 19 | 22 | 36 | 32 | 25 | 45 |
| | TD | | 9 | 7 | 8 | 16 | 13 | 13 | 21 | 15 | 18 | 24 | 35 | 31 | 24 | 43 |

SEPARATOR FOR LITHIUM SECONDARY BATTERY WITH IMPROVED ADHESIVENESS TOWARDS ELECTRODE AND RESISTANCE CHARACTERISTICS AND LITHIUM SECONDARY BATTERY COMPRISING THE SEPARATOR

The present application is a continuation of U.S. patent application Ser. No. 17/044,364, filed on Oct. 1, 2020, which claims the benefit of Korean Patent Application No. 10-2018-0116543 filed on Sep. 28, 2018 with the Korean Intellectual Property Office, the disclosure of which is incorporated herein by reference in its entirety.

TECHNICAL FIELD

The present disclosure relates to a separator for a lithium secondary battery with improved adhesiveness towards electrode and resistance characteristics and a lithium secondary battery comprising the separator.

BACKGROUND ART

A lithium secondary battery is a rechargeable energy storage device with high energy density that reversibly converts chemical energy into electrical energy, basically including a positive electrode, a negative electrode, a separator and an electrolyte solution, and has a wide range of application including small electron devices such as mobile phones and laptop computers. Recently, applications to hybrid electric vehicles (HEVs), Plug-in EVs, e-bikes and energy storage systems (ESSs) are rapidly expanding to deal with environmental issues, high oil prices, energy efficiency and storage.

In the manufacture and use of the lithium secondary battery, it is important to ensure safety. Particularly, the separator commonly used in the lithium secondary battery show severe thermal contraction behaviors in a high temperature due to its material properties and manufacturing process characteristics, causing a stability problem, for example, an internal short. More recently, to ensure safety of the lithium secondary battery, an organic-inorganic composite porous separator having a porous inorganic coating layer formed by coating a mixture of inorganic particles and binder polymer on a porous substrate has been suggested. However, when an electrode assembly is formed by stacking an electrode and the separator, there is a high risk that the electrode and the separator may be separated due to insufficient interlayer adhesiveness, and in this case, the separated inorganic particles may act as local defects in the device.

To solve these problems, there is a method that forms an adhesive layer by inducing the binder polymer migration to the separator surface through wet phase separation of PVDF-based copolymer, for example, PVDF-HFP and PVDF-CTFE to give adhesiveness to the separator coating layer.

The PVDF-based copolymer changes in solubility in solvent, electrolyte solution wetting property and adhesiveness towards electrode according to the type and content of comonomer. For example, when HFP and CTFE comonomers are used, they provide amorphous regions and provide solubility in solvent, electrolyte solution wetting property and adhesiveness towards electrode. As the comonomer content increases, amorphous regions increase and solubility in solvent and electrolyte solution wetting property increase, while the phase transition characteristics for non-solvent are poor, making it difficult to form a pore structure by wetting. Additionally, the adhesiveness and phase transition characteristics of the binder polymer change according to the type of comonomer. For example, PVDF-CTFE forms a micropore structure with a wider surface area and has higher adhesiveness than PVDF-HFP in the same coating condition. However, it is sensitive to non-solvents, making it difficult to control the pore shape and it has low solubility in solvent, making it difficult to manage the process. Accordingly, two types of PVDF-based copolymers may be used in combination so that advantages of two types of binder polymers work together. However, when two types of binder polymers are mixed, the process complexity increases and the phase separation rates of the two types of binder polymers are different, resulting in the pore structure and distribution of the binder polymers non-uniform, thereby failing to obtain a targeted binder polymer effect.

DISCLOSURE

Technical Problem

The present disclosure is directed to providing a separator for a lithium secondary battery having a porous coating layer including inorganic particles, in which the separator has improved adhesiveness towards electrode and resistance characteristics.

The present disclosure is further directed to providing a separator for a lithium secondary battery having a porous coating layer including inorganic particles, in which the separator has improved adhesiveness towards electrode and reduced interfacial resistance characteristics.

The present disclosure is further directed to providing a separator for a lithium secondary battery having a porous coating layer including inorganic particles, in which the separator has improved adhesiveness towards electrode, reduced interfacial resistance characteristics and improved air permeability, and besides, improved thermal stability due to interstitial volumes present in the porous coating layer.

These and other objects and advantages of the present disclosure will be understood from the following description. It will be readily understood that the objects and advantages of the present disclosure may be realized by the means or methods set forth in the appended claims and a combination thereof.

Technical Solution

According to the first embodiment of the present disclosure, there is provided a separator for a lithium secondary battery comprising a porous substrate, and a porous coating layer disposed on at least one surface of the porous substrate and comprising inorganic particles and binder polymer, wherein the binder polymer is terpolymer including a repeat unit derived from vinylidenefluoride (VDF), a repeat unit derived from hexafluoropropylene (HFP) and a repeat unit derived from chlorotrifluoroethylene (CTFE), the terpolymer includes 65 to 90 weight % of the repeat unit derived from VDF, 1 to 28 weight % of the repeat unit derived from HFP and 5 to 28 weight % of the repeat unit derived from CTFE, and the separator for a lithium secondary battery has adhesiveness towards electrode ranging from 30 gf/25 mm to 150 gf/25 mm and machine direction (MD) thermal shrinkage of 1 to 18% and transverse direction (TD) thermal shrinkage of 1 to 17%.

According to the second embodiment of the present disclosure, there is provided the separator for a lithium secondary battery as defined in the first embodiment, wherein the terpolymer includes 65 to 90 weight % of the repeat unit derived from vinylidenefluoride (VDF), 1 to 20 weight % of the repeat unit derived from hexafluoropropylene (HFP) and 7 to 28 weight % of the repeat unit derived from chlorotrifluoroethylene (CTFE).

According to the third embodiment of the present disclosure, there is provided the separator for a lithium secondary battery as defined in the first or second embodiment, wherein the terpolymer includes 70 to 85 weight % of the repeat unit derived from vinylidenefluoride (VDF), 1 to 5 weight % of the repeat unit derived from hexafluoropropylene (HFP) and 7 to 28 weight % of the repeat unit derived from chlorotrifluoroethylene (CTFE).

According to the fourth embodiment of the present disclosure, there is provided the separator for a lithium secondary battery as defined in any one of the first to third embodiments, wherein the terpolymer has a weight average molecular weight of 200,000 to 1,000,000.

According to the fifth embodiment of the present disclosure, there is provided the separator for a lithium secondary battery as defined in any one of the first to fourth embodiments, wherein the porous coating layer comprises interstitial volumes between the inorganic particles, the interstitial volumes being voids defined by substantial contact between adjacent inorganic particles.

According to the sixth embodiment of the present disclosure, there is provided the separator for a lithium secondary battery as defined in any one of the first to fifth embodiments, wherein when a weight fraction of F (fluorine) and a weight fraction of Cl (chlorine) are indicated such that a sum of each weight fraction is 100, the weight fraction (a) of Cl (chlorine) in a surface region of the porous coating layer and the weight fraction (b) of Cl (chlorine) in a bottom region of the porous coating layer satisfy the following condition, wherein the surface region is defined as a region extending downwards from the surface to the bottom by 10% of the total thickness of the porous coating layer, and the bottom region is defined as a region extending upwards from the bottom of the porous coating layer to the surface by 10% of the total thickness of the porous coating layer:

$$0 \leq |(a-b)/a \times 100| \leq 100.$$

According to the seventh embodiment of the present disclosure, there is provided the separator for a lithium secondary battery as defined in any one of the first to sixth embodiments, wherein when a weight fraction of F (fluorine) and a weight fraction of Cl (chlorine) are indicated such that a sum of each weight fraction is 100, the weight fraction (a) of Cl (chlorine) in the surface region of the porous coating layer and the weight fraction (b) of Cl (chlorine) in the bottom region of the porous coating layer satisfy the following condition, wherein the surface region is defined as a region extending downwards from the surface to the bottom by 10% of the total thickness of the porous coating layer, and the bottom region is defined as a region extending upwards from the bottom of the porous coating layer to the surface by 10% of the total thickness of the porous coating layer:

$$0 \leq |(a-b)/a \times 100| \leq 50.$$

According to the eighth embodiment of the present disclosure, there is provided the separator for a lithium secondary battery as defined in any one of the first to seventh embodiments, wherein the porous coating layer further comprises an additional binder polymer, a dispersant, or a combination thereof.

According to the ninth embodiment of the present disclosure, there is provided the separator for a lithium secondary battery as defined in any one of the first to eighth embodiments, wherein the additional binder polymer is one selected from the group consisting of vinylidenefluoride derived binary copolymer, polymethylmethacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, acrylonitrile-styrene-butadiene copolymer and polyimide, or a combination thereof.

According to the tenth embodiment of the present disclosure, there is provided the separator for a lithium secondary battery as defined in the first embodiment, wherein the separator for a lithium secondary battery has 1.3 to 7.0 times higher air permeability than that of the porous substrate.

According to the eleventh embodiment of the present disclosure, there is provided a lithium secondary battery comprising a positive electrode and a negative electrode and a separator interposed between the positive electrode and the negative electrode, wherein the separator is the separator for a lithium secondary battery according to any one of the first to tenth embodiments.

Advantageous Effects

The separator for a lithium secondary battery according to the present disclosure has uniform micropores on the surface, and thus has the increased adhesive surface area with electrode and consequential improved adhesiveness towards electrode.

In addition, the separator for a lithium secondary battery according to the present disclosure has ion conduction paths due to the uniform micropores formed on the surface, thereby achieving low interfacial resistance and improved air permeability. Accordingly, a lithium secondary battery using the separator for a lithium secondary battery according to the present disclosure may have improved output and life characteristics.

BRIEF DESCRIPTION OF DRAWINGS

The accompanying drawings illustrate a preferred embodiment of the present disclosure, and together with the detailed disclosure, serve to describe the principle of the present disclosure, and the scope of the present disclosure is not limited thereto. Meanwhile, the shape, size, scale or proportion of the elements in the drawings may be exaggerated to put emphasis on clearer description.

FIG. 7 is a table showing the evaluation results of examples 1 to 5 and comparative examples 1 to 9.

BEST MODE

Figure 1A:
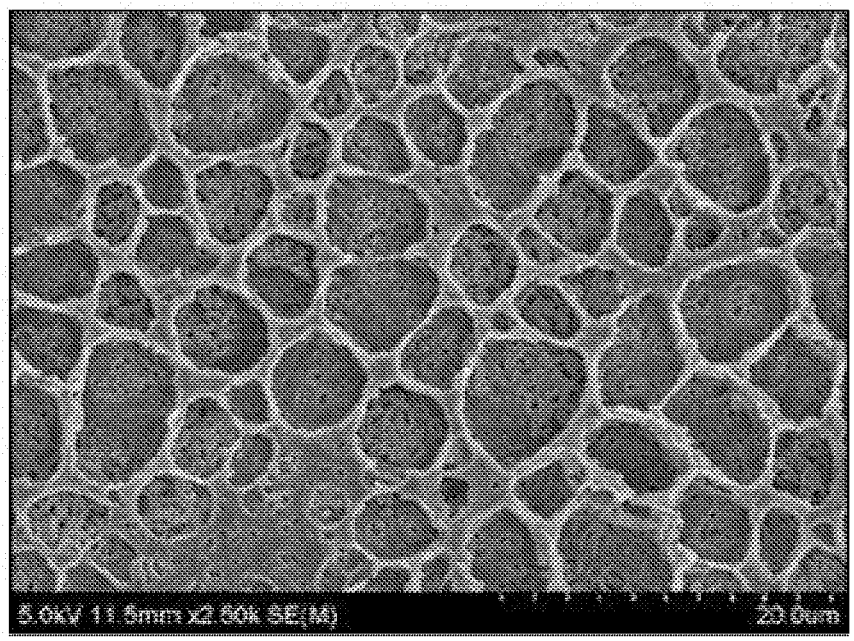
FIGS. 1a to 1d are scan electron microscope (SEM) images respectively showing surface and cross section of example 1 separator and surface and cross section of reference example 1 separator.

The terms or words used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description disclosed herein and illustration shown in the drawings are just a most preferable example, not intended to fully describe the technical aspects of the present disclosure, so it should be understood that other equivalents and modifications could be made thereto at the time of filing an application.

According to the present disclosure, there is provided a separator comprising a porous substrate; and a porous coating layer disposed on at least one surface of the porous substrate and comprising inorganic particles and binder polymer, wherein the binder polymer is terpolymer including a repeat unit derived from vinylidenefluoride (VDF), a repeat unit derived from hexafluoropropylene (HFP) and a repeat unit derived from chlorotrifluoroethylene (CTFE).

Hereinafter, the present disclosure will be described in detail by component.

1. Porous Substrate

According to a particular embodiment of the present disclosure, the porous substrate may include, without limitation, any type that is commonly used as a separator material for a lithium secondary battery if it electrically insulates the negative electrode from the positive electrode to prevent a short circuit and provides a movement path of lithium ions. The porous substrate includes, but is not limited thereto, for example, a porous substrate made of at least one of polymer resins such as polyolefin, polyethyleneterephthalate, polybutyleneterephthalate, polyacetal, polyamide, polycarbonate, polyimide, polyetheretherketone, polyethersulfone, polyphenyleneoxide, polyphenylenesulfide and polyethylenenaphthalene.

Additionally, for the porous substrate, a film in the shape of a sheet formed by melting polymer resin may be used. Preferably, the porous substrate is a porous polymer substrate which is a film in the shape of a sheet formed by melting the polymer resin.

In detail, the porous polymer substrate is one of the following:
 a) a porous film formed by melting/extruding polymer resin,
 b) a multilayer membrane including a) porous film stacked in two or more layers,
 c) a porous composite membrane of multilayer structure including a) and b).

In the present disclosure, the thickness of the porous substrate may be appropriately selected within the range of between 5 and 50 μm. The range of the porous substrate is not particularly limited to the above-described range, but when the thickness is so much less than the above-described lower limit, the separator is prone to damage while the battery is being used due to the degradation of the mechanical properties. Meanwhile, the size and porosity of the pores present in the porous substrate are not particularly limited, but the pore size and porosity may be 0.01 to 50 μm and 10 to 95% respectively.

2. Porous Coating Layer

In a particular embodiment of the present disclosure, the porous coating layer is formed on one or two surfaces of the polymer substrate. The porous coating layer comprises a mixture of inorganic particles and binder polymer, and it is formed into a layer in which the inorganic particles are bonded together by the medium of the binder polymer. That is, the inorganic particles in the porous coating layer are coated with the binder polymer on the surface in whole or in part, and hence the inorganic particles are bonded to each other point-to-point and/or surface-to-surface. Additionally, the porous coating layer is adhered to the porous substrate by the medium of the binder polymer. The separator of the present disclosure has much improved heat resistance and mechanical properties due to the surface coating of the porous substrate with the porous coating layer including the inorganic particles.

In a particular embodiment of the present disclosure, the binder of the porous coating layer may bind together the inorganic particles to keep them bonded to each other (i.e., the binder connects and immobilizes the inorganic particles), and the binder may keep the inorganic particles bonded to the porous polymer substrate. The inorganic particles of the porous coating layer may form interstitial volumes by substantial contact between them, and in this instance, the interstitial volumes refer to voids defined by the inorganic particles in substantial contact with each other in a packed structure (closed packed or densely packed) by the inorganic particles. The interstitial volumes between the inorganic particles are voids that will form the pores of the porous coating layer.

The porous coating layer has a microporous structure by the interstitial volumes between the inorganic particles and also serves as a spacer to maintain the physical shape of the porous coating layer. Additionally, since the inorganic particles generally do not change in physical properties at high temperature of 200° C. or above, the formed porous coating layer allows the separator to have good heat resistance, for example, thermal shrinkage. In the present disclosure, the porous coating layer may have the thickness ranging from 1 μm to 50 μm, or from 2 μm to 30 μm or from 2 μm to 20 μm.

In the porous coating layer, a ratio of the amount of the inorganic particles and the amount of the binder polymer is determined considering the thickness, pore size and porosity of the finally formed porous coating layer of the present disclosure, and the amount of the inorganic particles is 50 to 99.9 weight % or 60 to 99.5 weight %, and the amount of the binder polymer is 0.1 to 50 weight % or 0.5 to 40 weight % on the basis of weight ratio. When the amount of the inorganic particles is less than 50 weight %, a very large amount of binder polymer reduces the pore size and porosity due to reduction of the interstitial volumes between the inorganic particles, causing the final battery performance degradation. On the contrary, when the amount of inorganic particles is larger than 99.9 weight %, a very small amount of binder polymer degrades the mechanical properties of the final porous coating layer due to reduction of the bond strength between the inorganic particles.

According to a particular embodiment of the present disclosure, the inorganic particle size of the porous coating layer is not limited, but for the coating layer with uniform thickness and appropriate porosity, the inorganic particle size may range from to 10 μm or from 0.01 to 10 μm or from 0.05 to 5 μm or from 0.1 to 2 μm. When the inorganic particle size satisfies the above-described range, dispersion is maintained, making it easy to adjust the properties of the separator, and an increase in thickness of the porous coating layer is avoided, thereby improving the mechanical properties, and there is a low probability that an internal short may occur during charging and discharging of a battery due to the large pore size.

The inorganic particles include, without limitation, any type of inorganic particle that is electrochemically stable. That is, the inorganic particles are not limited to a particular type if they do not cause oxidation and/or reduction reactions in the operating voltage range (for example, 0-5V vs Li/Li$^+$) of an electrochemical device used. Particularly, the use of ion transportable inorganic particles increases the ionic conductivity in the electrochemical device, contributing to the performance improvement. Additionally, the use of inorganic particles of high dielectric constant contributes to the dissociation increase of an electrolyte salt, for example, a lithium salt, in a liquid electrolyte, thereby improving the ionic conductivity of an electrolyte solution.

By the above-described reasons, the inorganic particles may include inorganic particles of high dielectric constant of 5 or more or 10 or more, lithium ion transportable inorganic particles, or a combination thereof. Non-limiting examples of the inorganic particles having the dielectric constant of 5 or more may include $BaTiO_3$, $Pb(Zr,Ti)O_3$ (PZT), $Pb_{1-x}La_xZr_{1-y}Ti_yO_3$ (PLZT, 0<x<1, 0<y<1), $Pb(Mg_{1/3}Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, γ-AlOOH, SiC, $TiO_2$, etc., alone or in combination. Additionally, the inorganic particles of high dielectric constant and the lithium ion transportable inorganic particles, as above-mentioned, may provide a synergistic effect when used in combination.

Non-limiting examples of the lithium ion transportable inorganic particles may include lithium phosphate ($Li_3PO_4$), lithium titanium phosphate ($Li_xTi_y(PO_4)_3$, 0<x<2, 0<y<3), lithium aluminum titanium phosphate ($Li_xAl_yTi_z(PO_4)_3$, 0<x<2, 0<y<1, 0<z<3), (LiAlTiP)$_xO_y$ based glass (0<x<4, 0<y<13) such as $14Li_2O-9Al_2O_3-38TiO_2-39P_2O_5$, etc., lithium lanthanum titanate ($Li_xLa_yTiO_3$, 0<x<2, 0<y<3), lithium germanium thiophosphate ($Li_xGe_yP_zS_w$, 0<x<4, 0<y<1, 0<z<1, 0<w<5) such as $Li_{3.25}Ge_{0.25}P_{0.75}S_4$, etc., lithium nitride ($Li_xN_y$, 0<x<4, 0<y<2) such as $Li_3N$, etc., $SiS_2$ based glass ($Li_xSi_yS_z$, 0<x<3, 0<y<2, 0<z<4) such as $Li_3PO_4$—$Li_2S$—$SiS_2$, etc., $P_2S_5$ based glass ($Li_xP_yS_z$, 0<x<3, 0<y<3, 0<z<7) such as $LiILi_2S$—$P_2S_5$ etc., or a combination thereof.

The binder polymer included in the porous coating layer includes a repeat unit derived from vinylidene fluoride (VDF), a repeat unit derived from hexafluoropropylene (HFP) and a repeat unit derived from chlorotrifluoroethylene (CTFE), and preferably, the binder polymer substantially includes a repeat unit derived from VDF, a repeat unit derived from HFP and a repeat unit derived from CTFE, and more preferably, a repeat unit derived from VDF, a repeat unit derived from HFP and a repeat unit derived from CTFE. The term "substantially" represents that although there are unavoidably a very small or trace amount of impurities or other substances in the manufacturing process, the amount of impurities or other substances does not provide a significant effect on the intended object.

The VDF-HFP-CTFE terpolymer used in the porous coating layer of the present disclosure includes a repeat unit derived from VDF, a repeat unit derived from HFP and a repeat unit derived from CTFE, and when the sum of the derived repeat units is 100 weight %, the VDF-HFP-CTFE terpolymer includes 65 to 90 weight % of repeat units derived from VDF, 1 to 28 weight % of repeat units derived from HFP and 5 to 28 weight % of repeat units derived from CTFE. In a particular embodiment of the present disclosure, the VDF-HFP-CTFE terpolymer may include 65 to 90 weight % of repeat units derived from VDF, 1 to 20 weight % of repeat units derived from HFP and 7 to 28 weight % of repeat units derived from CTFE. In another particular embodiment of the present disclosure, the VDF-HFP-CTFE terpolymer may include 70 to 90 weight % of repeat units derived from VDF, 1 to 5 weight % of repeat units derived from HFP and 7 to 28 weight % of repeat units derived from CTFE. In another particular embodiment of the present disclosure, the VDF-HFP-CTFE terpolymer may include 70 to 85 weight % of repeat units derived from VDF, 1 to 5 weight % of repeat units derived from HFP and 7 to 28 weight % of repeat units derived from CTFE. In another particular embodiment of the present disclosure, the VDF-HFP-CTFE terpolymer may include 74 to 80 weight % of repeat units derived from VDF, 1 to 15 weight % of repeat units derived from HFP and 10 to 26 weight % of repeat units derived from CTFE. In another particular embodiment of the present disclosure, the VDF-HFP-CTFE terpolymer may include 74 to 80 weight % of repeat units derived from VDF, 1 to 10 weight % of repeat units derived from HFP and 10 to 26 weight % of repeat units derived from CTFE.

When the amount of repeat units derived from VDF is less than the above-described range, the phase separation characteristics are poor, failing to form a binder polymer layer on surface, and when the amount of repeat units derived from VDF is more than the above-described range, crystallinity is high, failing to swell in an electrolyte solution. Additionally, the amount of repeat units derived from HFP is less than the above-described range, the solubility in solvent is low, making it difficult to control the process, and phase separation is fast and the bond strength in the coating layer is low. When the amount of repeat units derived from HFP is more than the above-described range, the solubility in solvent is high, failing to implement the phase separation characteristics. Additionally, when the amount of repeat units derived from CTFE is less than the above-described range, the micropore structure formation effect is insufficient, and when the amount of repeat units derived from CTFE is more than the above-described range, the binder polymer swells after an electrolyte solution is injected when manufacturing a cell, causing the separation of the coating layer.

In a particular embodiment of the present disclosure, the VDF-HFP-CTFE terpolymer used in the porous coating layer of the present disclosure may have the sum of the repeating units derived from HFP and the repeating units derived from CTFE ranging from 10 to 35 weight % or from 15 to 30 weight %, when the sum of the derived repeating units is 100 weight %. There is a problem with reduction in the solubility in solvent and miscibility in electrolyte solution, when the sum of the repeat unit derived from HFP and the repeat unit derived from CTFE is less than the lower limit. There is also a problem with poor phase separation characteristics and failure to form a binder polymer layer on the surface easily, when the sum of the repeat unit derived from HFP and the repeat unit derived from CTFE is more than the upper limit. When the sum of the repeat unit derived from HFP and the repeat unit derived from CTFE satisfies the above-described range, it is possible to avoid those problems.

The VDF-HFP-CTFE terpolymer may satisfy the above-described derived repeat unit composition and have the weight average molecular weight of 200,000 to 1,000,000 or 200,000 to 800,000 or 300,000 to 700,000 or 400,000 to 650,000. When the weight average molecular weight satisfies the above-described range, binder polymer migration to a surface layer is easy, and sufficient adhesiveness is provided.

The VDF-HFP-CTFE terpolymer may be present in an amount of 3 to 100 parts by weight or 3 to 70 parts by weight or 5 to 45 parts by weight or 5 to 35 parts by weight based on 100 parts by weight of the inorganic particles. When the amount of the VDF-HFP-CTFE terpolymer satisfies the above-described range, adhesiveness between the inorganic particles increases, thereby improving the mechanical properties of the coating layer, and the resistance of the battery does not increase due to the spaces between the inorganic particles, thereby improving the heat resistance property of the coating layer.

In an embodiment of the present disclosure, in addition to the above-described VDF-HFP-CTFE terpolymer, the porous coating layer may comprise an additional binder polymer. Non-limiting examples of the additional binder polymer may include vinylidenefluoride derived binary copolymers including poly(vinylidene fluoride-co-hexafluoropropylene), poly(vinylidene fluoride-co-chlorotrifluoroethylene) and poly(vinylidene fluoride-co-trifluoroethylene), etc., polymethylmethacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, acrylonitrile-styrene-butadiene copolymer, polyimide, or a combination thereof.

The porous coating layer of the present disclosure may further comprise a dispersant or a dispersible binder. The dispersant exerts a function of improving the dispersion of the inorganic particles. Additionally, since the dispersant has not only the function of improving dispersion but also a binder function having adhesiveness, the dispersant may be referred to as a dispersible binder. Non-limiting examples of the dispersant may include an acrylic based copolymer, cyanoethyl polyvinylalcohol, baicalein, luteolin, taxifolin, myricetin, quercetin, rutin, catechin, epigallocatechin gallate, butein, piceatannol, phenol-based compound containing tannic acid, pyrogallic acid, amylose, amylopectin, xanthan gum, an aliphatic based compound or polymer compounds of two or more of them.

The acrylic based copolymer may be a copolymer including an OH group, a COOH group, a CN group, an amine group, an amide group or two or more functional groups of them.

For example, the acrylic based copolymer may include, but is not limited to, ethyl acrylate-acrylic acid-N,N-dimethylacrylamide copolymer, ethyl acrylate-acrylic acid-2-(dimethylamino)ethyl acrylate copolymer, ethyl acrylate-acrylic acid-N,N-diethylacrylamide copolymer, ethyl acrylate-acrylic acid-2-(diethylamino)ethyl acrylate copolymer, or a combination thereof.

In the present disclosure, the porous coating layer preferably has a uniform distribution of the repeat unit derived from HFP and the repeat unit derived from CTFE in the plane and thickness direction. Particularly, the porous coating layer of the present disclosure features a uniform distribution of the repeat unit derived from HFP and the repeat unit derived from CTFE in the thickness direction. As a result, the porous coating layer of the present disclosure has no significant difference in the composition of F atom and Cl atom at each of the surface of contact with the electrode and the surface of contact with the porous substrate. In more detail, the porous coating layer of the present disclosure has no significant difference in the composition of F atom and Cl atom at the area within 1 μm in the thickness direction from the surface of contact with the electrode and the area within 1 μm in the thickness direction from the surface of contact with the porous substrate.

In the present specification, 'the composition of F atom and Cl atom is uniform and has no significant difference' represents that a weight ratio of F (fluorine):Cl (chlorine) is uniformly distributed over the surface region and bottom region of the porous coating layer, as evaluated from a value of "$|(a-b)/a \times 100|$", a conditional equation of the weight fraction of Cl (chlorine) (a) in the surface region of the porous coating layer and the weight fraction of Cl (chlorine) (b) in the bottom region of the porous coating layer, when indicated such that the sum of the weight fraction of F (fluorine) and the weight fraction of Cl (chlorine) is 100.

According to an embodiment of the present disclosure, the conditional equation may be $0 \leq |(a-b)/a \times 100| \leq 100$, and specifically, $0 \leq |(a-b)/a \times 100| \leq 50$.

In this instance, the surface region is defined as a region extending downward from the surface to the bottom by 10% of the total thickness of the porous coating layer, and the bottom region is defined as a region extending upwards from the bottom of the porous coating layer to the surface by 10% of the total thickness of the porous coating layer.

The weight fraction of F (fluorine) and the weight fraction of Cl (chlorine) are determined by determining how much fluorine and chlorine are detected in the bottom region and the surface region of the separator cross section specimen having the porous coating layer using Energy Dispersive Spectrometer (EDS) attached to an electron microscope.

Meanwhile, the pore size and porosity of the porous coating layer usually depends on the size of the inorganic particles, and for example, when the inorganic particles having the particle size of 1 μm or less are used, the formed pores are 1 μm or less in size. The pore structure is filled with an electrolyte solution that will be injected later, and the injected electrolyte solution serves to transfer ions. Accordingly, the pore size and porosity is an important factor to control the ionic conductivity of the porous inorganic coating layer.

According to a particular embodiment of the present disclosure, the pore size of the porous coating layer may range from 0.001 to 10 μm or from 0.001 to 1 μm.

According to a particular embodiment of the present disclosure, the porosity of the porous coating layer of the present disclosure may range from 5 to 95% or from 10 to % or from 20 to 90% or from 30 to 80%. The porosity corresponds to a value obtained by subtracting the volume converted from the weight and density of each component of the coating layer, from the volume calculated using the thickness, width and length of the porous inorganic coating layer.

When the porous inorganic coating layer has the above-described range of pore size and/or porosity, the separator according to an embodiment of the present disclosure may prevent a short circuit in an abnormal situation and have appropriate resistance characteristics and air permeability at the same time.

3. Method for Manufacturing a Porous Coating Layer

In a particular embodiment of the present disclosure, the porous coating layer is formed by adding the above-described inorganic particles and binder polymer to a solvent and mixing them to prepare slurry for forming a porous coating layer, coating the slurry on the porous substrate and drying the slurry.

In a particular embodiment of the present disclosure, the solvent is an organic solvent, and is not limited to a particular type if it can uniformly disperse the inorganic particles and the binder polymer.

In a particular embodiment of the present disclosure, the organic solvent may include, cyclic aliphatic hydrocarbons including cyclopentane and cyclohexane, etc.; aromatic hydrocarbons including toluene, xylene and ethylbenzene, etc.; ketones including acetone, ethylmethylketone, diisopropylketone, cyclohexanone, methylcyclohexane and ethylcyclohexane, etc.; chlorine-based aliphatic hydrocarbon including methylenechloride, chloroform and carbon tetrachloride, etc.; esters including ethyl acetate, butyl acetate, γ-butyrolactone and ε-caprolactone, etc.; nitriles including acetonitrile and propionitrile, etc.; ethers including tetrahydrofuran and ethyleneglycoldiethylether, etc.; alcohols including methanol, ethanol, isopropanol, ethyleneglycol and ethyleneglycolmonomethylether, etc.; amides including N-methylpyrrolidone and N,N-dimethylformamide, etc., and the solvent may include acetone when considering its advantage in the drying process.

In a particular embodiment of the present disclosure, the solvent may be used alone or in combination. Among them, especially solvents having a low boiling point and high volatility are desirable since they can be removed in a short time at low temperature. In detail, preferably, the solvent may include acetone, toluene, cyclohexanone, cyclopentane, tetrahydrofuran, cyclohexane, xylene and N-methylpyrrolidone, alone or in combination.

A ratio of the inorganic particles and the binder polymer in the slurry is preferably the same as described above in relation to the porous coating layer.

In a particular embodiment of the present disclosure, any method may be used to coat the slurry on the porous substrate to form the porous coating layer, and may include, a dip coating method, a die coating method, a roll coating method, a comma coating method, a doctor blade coating method, a reverse roll coating method and a direct roll coating method, etc.

The coating process for forming the porous coating layer is preferably performed in the wet phase separation condition, i.e., the temperature ranging from 15° C. to 70° C. or from 20° C. to 50° C. and the relative humidity ranging from 15% to 80% or from 30% to 50%. After the slurry is coated and dried, the VDF-HFP-CTFE terpolymer according to the present disclosure dissolved in the coating layer (slurry) has phase transition characteristics by phase separation known in the art (vapor-induced phase separation) and forms an interstitial volume structure in the porous coating layer.

In general, PVDF-HFP shows the non-solvent induced phase transition faster and forms a pore structure better at lower HFP content, but as an amount of binder polymer remaining in the coating layer reduces during phase separation, the binding characteristics of the coating layer reduce. With the decreasing HFP content, the solubility in solvent and the swelling characteristics in electrolyte solution reduce, which places a limitation to reducing the HFP content.

In the case of PVDF-CTFE, the adhesiveness of the binder polymer itself is higher than PVDF-HFP and forms a pore structure having a wide surface area, but at a high CTFE content of 20 wt % or more, polymer precipitation occurs at the same time as wet phase separation due to the sensitivity to non-solvents. Accordingly, when PVDF-CTFE is used alone, a binder polymer layer is not formed on the surface, failing to exhibit the high adhesive property of PVDF-CTFE.

Accordingly, to combine the characteristics of different types of binder polymers, in some cases, PVDF-HFP and PVDF-CTFE may be used in combination. However, when different types of binder polymers are simply mixed together, due to different phase separation characteristics of the binder polymers, pores are not uniform, a pore structure including macropores and micropores is formed, and HFP units and CTFE units are not uniformly distributed in the coating layer.

In contrast, the VDF-HFP-CTFE terpolymer according to the present disclosure has a similar process window to PVDF-HFP during phase separation, while the presence of both the HFP unit and the CTFE unit in the polymer chain leads to a uniform distribution of substituents in the coating layer, and pores are formed through the single binder polymer, resulting in a uniform pore structure. Additionally, compared to PVDF-HFP, the VDF-HFP-CTFE terpolymer of the present disclosure forms micropores, thereby increasing the surface area of the adhesive layer on the surface and improving resistance.

In a particular embodiment of the present disclosure, a non-solvent in gas state may be introduced for the phase separation. The non-solvent is not limited to a particular type if it does not dissolve the binder polymer and is partially compatible with the solvent, and for example, may include water, methanol, ethanol, isopropanol, butanol, or a combination thereof.

When the non-solvent in gas state is introduced and added, a small amount of non-solvents may be used in the phase separation, and it is easier to make the inorganic slurry dry.

In this instance, the non-solvent in gas state may be added at the temperature of to 70° C. When the temperature is lower than 15° C., the non-solvent cannot maintain the gas state and the inorganic slurry is slowly dried, resulting in low productivity, and when the temperature is higher than 70° C., the solvent and the non-solvent are dried so fast that sufficient phase separation does not occur.

Additionally, in the phase separation, the non-solvent is added such that the vapor pressure of the non-solvent is 15% to 80% or 30% to 50% compared to the saturated vapor pressure, and subsequently, phase separation may be performed. When the vapor pressure of the non-solvent is less than 15% compared to the saturated vapor pressure, the amount of the non-solvent is not large enough to cause phase separation, and when the vapor pressure of the non-solvent is more than 80%, phase separation takes place so much that it is difficult to obtain uniform coating.

To cause phase separation to occur with an addition of the non-solvent in gas state, it is advantageous that evaporation is likely to occur due to the low boiling point of the solvent. That is, when the solvent is evaporated and the temperature decreases, the non-solvent in gas state condenses and the exchange between the non-solvent and the solvent easily takes place. In a specific example, when the non-solvent in gas state is added, the boiling point of the solvent may be from 30° C. to 80° C. Additionally, the solvent of the inorganic slurry containing the added non-solvent in gas state may be, for example, acetone, methylethylketone, or a combination thereof.

The separator according to an embodiment of the present disclosure does not go through an immersion process during or after the phase separation. The immersion process may clog the pores formed by the interstitial volumes in the porous coating layer, failing to provide the resistance reduction effect that the present disclosure intends to achieve.

The separator of the present disclosure may be dried after the phase separation. The drying may use a method known in the art, and may be performed by a batch or continuous process using an oven or a heating chamber within the temperature range taking into account the vapor pressure of the solvent used. The drying is performed to remove the solvent almost from the slurry, and when considering productivity, the shorter the better. For example, the drying may be performed for 1 minute or less, or 30 seconds or less.

The porous coating layer may be selectively formed on one or two surfaces of the porous substrate.

According to a particular embodiment of the present disclosure, the separator of the present disclosure may have adhesiveness towards electrode ranging from 30 gf/25 mm to 150 gf/25 mm or from 50 gf/25 mm to 100 gf/25 mm, and in this instance, the adhesiveness towards electrode is measured by the following method: the separator is prepared by tailoring to the size of 25 mm×70 mm. The prepared separator and the anode are overlapped with each other, interposed between a 100 μm PET film, and adhered using a flat plate press. In this instance, the condition of the flat plate press is heat pressing at the temperature of 70° C. and the pressure of 600 kgf for 1 second. The separator and the anode adhered to each other are attached to a slide glass using a double-sided tape. Part of the separator adhesive surface, i.e., 10 mm or less from the end of the adhesive surface is peeled off and adhered such that the longitudinal direction is connected to a 25×100 mm PET film using a single sided tape. A force is applied 180° at 300 mm/min with the slide glass being placed on a lower holder of UTM instrument (LLOYD Instrument LF Plus) and the PET film attached to the separator being placed on an upper holder of the UTM instrument, and a force required to separate the separator from the anode is measured. When the separator of the present disclosure has the above-described range of adhesiveness towards electrode, it is easy to manufacture an electrode assembly by stacking the electrode and the separator, and the interfaces of the electrode and the separator are brought into close contact, resulting in reduced interfacial resistance and reduced side reactions of the electrode and the electrolyte solution on the active material surface.

According to a particular embodiment of the present disclosure, the separator of the present disclosure may have the MD thermal shrinkage of 1 to 18% or 5 to 18% and the TD thermal shrinkage of 1 to 17% or 4 to 17%, and in this instance, the thermal shrinkage is calculated by cutting the separator sample to the size of 50 mm (length)×50 mm (width) to prepare a test piece, keeping it in an oven heated to 150° C. for 30 minutes, and subsequently, taking the test piece and measuring changed lengths in MD and TD: shrinkage (%)={(dimension before contraction−dimension after contraction)/dimension before contraction}×100

When the separator of the present disclosure has the above-described range of thermal shrinkage, the separator may be safe at high temperature.

According to a particular embodiment of the present disclosure, when compared with air permeability of the porous substrate itself, the separator of the present disclosure may have air permeability 1.3 to 7.0 times or 2.0 to 6.5 times or 3.9 to 6.6 times or 3.9 to 4.1 times higher than that of the porous substrate. For example, the separator manufactured using the porous substrate having 100 sec/100 mL may have air permeability ranging from 130 to 700 sec/100 mL. When the separator of the present disclosure has the above-described range of air permeability, it is possible to smoothly transport lithium ions and prevent the current leaks. In this instance, air permeability is measured using a Gurley type air permeability tester in accordance with JIS P-8117, and the time taken for 100 ml of air to pass through the separator having the diameter 28.6 mm and the area of 645 mm² is measured.

The separator according to the present disclosure manufactured as described above may be used as a separator for an electrochemical device. The electrochemical device includes any type of device using electrochemical reactions, and in a specific example, includes primary and secondary batteries, fuel cells, solar cells or capacitors, etc. Particularly, among the secondary batteries, lithium secondary batteries including lithium metal secondary batteries, lithium ion secondary batteries, lithium polymer secondary batteries or lithium ion polymer secondary batteries, etc., are desirable.

In a particular embodiment according to the present disclosure, a lithium secondary battery may be manufactured by a common method known in the art. According to an embodiment of the present disclosure, a secondary battery may be manufactured by preparing an electrode assembly comprising a positive electrode, a negative electrode and the above-described separator interposed between the positive electrode and the negative electrode, putting the electrode assembly in a battery case and injecting an electrolyte solution.

In an embodiment of the present disclosure, the electrode of the secondary battery may be manufactured by attaching an electrode active material to an electrode current collector according to a common method known in the art. In the electrode active material, non-limiting examples of the positive electrode active material may include general positive electrode active materials commonly used in a positive electrode of an electrochemical device, and preferably, may include lithium intercalation materials such as lithium manganese oxide, lithium cobalt oxide, lithium nickel oxide, lithium iron oxide or their composite oxide. Non-limiting examples of the negative electrode active material may include general negative electrode active materials commonly used in a negative electrode of an electrochemical device, and preferably, may include lithium intercalation materials such as lithium metal or lithium alloy, carbon, petroleum coke, activated carbon, graphite or other carbons, etc. Non-limiting examples of the positive electrode current collector may include foils made of aluminum, nickel or a combination thereof, and non-limiting examples of the negative electrode current collector may include foils made of copper, gold, nickel or copper alloy or a combination thereof.

The electrolyte solution that may be used in the present disclosure includes a salt having a structure of $A^+B^-$ and an organic solvent, in which the salt dissolves or dissociates in the organic solvent. $A^+$ includes an alkali metal cation such as $Li^+$, $Na^+$, $K^+$ or a combination thereof and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the organic solvent may include, but is not limited to, at least one of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC) and gamma-butyrolactone (γ-butyrolactone), or combination thereof.

The pouring of the electrolyte solution may be performed in any suitable step of a battery fabrication process according to a manufacturing process and required properties of a final product. That is, the pouring of the electrolyte solution may be applied before battery assembly or in the final step of battery assembly. A process of applying the electrode assembly of the present disclosure to the battery may include winding that is commonly used, as well as lamination and stacking of the separator and the electrode and folding.

Hereinafter, the present disclosure will be described in detail through examples. However, the examples of the present disclosure may be modified in many other forms, and the scope of the present disclosure should not be construed as being limited to the following examples. The examples of the present disclosure are provided to fully explain the present disclosure to those having ordinary knowledge in the art to which the present disclosure pertains.

MODE FOR DISCLOSURE

Example

Example 1

P(VDF-HFP-CTFE)terpolymer (vinylidene fluoride-hexafluoropropylene-chlorotrifluoroethylene terpolymer) (weight average molecular weight: 500,000, containing 90 weight % of repeat units derived from vinylidenefluoride, 5 weight % of repeat units derived from hexafluoropropylene and 5 weight % of repeat units derived from chlorotrifluoroethylene) is added to acetone and dissolved at 50° C. for about 4 hours to prepare a binder polymer solution. 500 nm $Al_2O_3$ powder and 250 nm γ-AlOOH powder as inorganic particles are mixed at a weight ratio of 9:1 and added to the binder polymer solution at a weight ratio of binder polymer: total inorganic particles=1:4. After a dispersant, cyanoethyl polyvinylalcohol, is added in an amount of 2 weight % of the total amount of inorganic particles, the inorganic particles are pulverized and dispersed using a ball mill method for 12 hours in total to prepare slurry for forming a porous coating layer. In this instance, a ratio of solvents and solids is 4:1. The slurry for forming a porous coating layer is coated on two surfaces of a 6 cm×15 cm polyethylene porous substrate (thickness 9 μm, porosity 43%, air permeation time 110 sec, resistance 0.45Ω) by dip coating under the condition of 23° C. and 42% relative humidity such that the total coating amount on the two surfaces of the porous substrate is 13.5 g/m², and dried at 23° C. for 1 minute to manufacture a separator having a porous coating layer. The porous coating layer can be seen from SEM image.

Example 2

A separator having a porous coating layer is manufactured by the same method as example 1 except that a binder polymer solution is prepared using P(VDF-HFP-CTFE) terpolymer (vinylidene fluoride-hexafluoropropylene-chlorotrifluoroethylene terpolymer) (weight average molecular weight: 500,000, containing 80 weight % of repeat units derived from vinylidenefluoride, 1 weight % of repeat units derived from hexafluoropropylene and 19 weight % of repeat units derived from chlorotrifluoroethylene).

Example 3

A separator having a porous coating layer is manufactured by the same method as example 1 except that a binder polymer solution is prepared using P(VDF-HFP-CTFE) terpolymer (vinylidene fluoride-hexafluoropropylene-chlorotrifluoroethylene terpolymer) (weight average molecular weight: 500,000, containing 73 weight % of repeat units derived from vinylidenefluoride, 1 weight % of repeat units derived from hexafluoropropylene and 26 weight % of repeat units derived from chlorotrifluoroethylene.

Example 4

A separator having a porous coating layer is manufactured by the same method as example 1 except that a binder polymer solution is prepared using P(VDF-HFP-CTFE) terpolymer (vinylidene fluoride-hexafluoropropylene-chlorotrifluoroethylene terpolymer) (weight average molecular weight: 500,000, containing 80 weight % of repeat units derived from vinylidenefluoride, 10 weight % of repeat units derived from hexafluoropropylene and 10 weight % of repeat units derived from chlorotrifluoroethylene).

Example 5

A separator having a porous coating layer is manufactured by the same method as example 1 except that a binder polymer solution is prepared using P(VDF-HFP-CTFE) terpolymer (vinylidene fluoride-hexafluoropropylene-chlorotrifluoroethylene terpolymer) (weight average molecular weight: 500,000, containing 80 weight % of repeat units derived from vinylidenefluoride, 15 weight % of repeat units derived from hexafluoropropylene and 5 weight % of repeat units derived from chlorotrifluoroethylene).

Reference Example 1

Instead of the slurry for forming a porous coating layer of example 1, the binder polymer solution of example 1 is dip-coated on a 6 cm×15 cm polyethylene porous substrate (thickness 9 μm, porosity 43%, air permeation time 110 sec, resistance 0.45Ω) at the rate of 2 cm/sec under the condition of 23° C. and 42% relative humidity.

Comparative Example 1

A separator is manufactured by the same method as example 1 except that instead of P(VDF-HFP-CTFE) terpolymer as binder polymer, a binder polymer solution is prepared using P(VDF-HFP) binder polymer (weight average molecular weight: 500,000) containing 15 weight % of repeat units derived from HFP and P(VDF-CTFE) binder polymer (weight average molecular weight: 450,000) containing 20 weight % of repeat units derived from CTFE, and adding P(VDF-HFP), P(VDF-CTFE), a dispersant and inorganic particles to a solvent at a weight ratio of 17:3:2:78.

Comparative Reference Example 1

Instead of the slurry for forming a porous coating layer of comparative example 1, the binder polymer solution of comparative example 1 is dip-coated a 6 cm×15 cm polyethylene porous substrate (thickness 9 μm, porosity 43%, air permeation time 110 sec, resistance 0.45Ω) at the rate of 2 cm/sec under the condition of 23° C. and 42% relative humidity.

Comparative Example 2

A separator is manufactured by the same method as example 1 except that instead of P(VDF-HFP-CTFE), P(VDF-HFP) (weight average molecular weight: 450,000) containing 15 weight % of repeat units derived from HFP is used as the binder polymer.

Comparative Reference Example 2

The binder polymer solution of comparative example 2 is dip-coated on a 6 cm×cm polyethylene porous substrate (thickness 9 μm, porosity 43%, air permeation time 110 sec, resistance 0.45Ω) at the rate of 2 cm/sec under the condition of 23° C. and 42% relative humidity.

Comparative Example 3

A separator is manufactured by the same method as example 1 except that instead of P(VDF-HFP-CTFE), P(VDF-HFP) containing 8 weight % of repeat units derived from HFP (weight average molecular weight: 450,000) is used as the binder polymer.

Comparative Reference Example 3

The binder polymer solution of comparative example 3 is dip-coated on a 6 cm×cm polyethylene porous substrate (thickness 9 μm, porosity 43%, air permeation time 110 sec, resistance 0.45Ω) at the rate of 2 cm/sec under the condition of 23° C. and 42% relative humidity.

Comparative Example 4

A separator is manufactured by the same method as example 1 except that instead of P(VDF-HFP-CTFE), P(VDF-CTFE) containing 20 weight % of repeat units derived from CTFE (weight average molecular weight: 450,000) is used as the binder polymer.

Comparative Reference Example 4

The binder polymer solution of comparative example 4 is dip-coated on a 6 cm×cm polyethylene porous substrate (thickness 9 μm, porosity 43%, air permeation time 110 sec, resistance 0.45Ω) at the rate of 2 cm/sec under the condition of 23° C. and 42% relative humidity.

Comparative Example 5

A separator having a porous coating layer is manufactured by the same method as example 1 except that a binder polymer solution is prepared using P(VDF-HFP-CTFE) terpolymer (vinylidene fluoride-hexafluoropropylene-chlorotrifluoroethylene terpolymer) (weight average molecular weight: 450,000, containing 70 weight % of repeats unit derived from vinylidenefluoride, 1 weight % of repeats unit derived from hexafluoropropylene and 29 weight % of repeats unit derived from chlorotrifluoroethylene).

Comparative Example 6

P(VDF-HFP-CTFE)terpolymer (vinylidene fluoride-hexafluoropropylene-chlorotrifluoroethylene terpolymer) (weight average molecular weight: 500,000, containing 90 weight % of repeats unit derived from vinylidenefluoride, 5 weight % of repeats unit derived from hexafluoropropylene and 5 weight % of repeats unit derived from chlorotrifluoroethylene) is added to N-methyl pyrrolidone (NMP) and dissolved at 50° C. for about 4 hours to prepare a binder polymer solution, and 500 nm $Al_2O_3$ powder and 250 nm γ-AlOOH powder as inorganic particles are mixed at a weight ratio of 9:1 and added to the binder polymer solution at a weight ratio of binder polymer:total inorganic particles=1:4. After a dispersant, cyanoethyl polyvinylalcohol, is added in an amount of 2 weight % of the total amount of inorganic particles, the inorganic particles are pulverized and dispersed using a ball mill method for 12 hours in total to prepare slurry for forming a porous coating layer. In this instance, a ratio of solvents and solids is 9:1. The slurry for forming a porous coating layer is coated on two surfaces of a 6 cm×15 cm polyethylene porous substrate (thickness 9 μm, porosity 43%, air permeation time 110 sec, resistance 0.45Ω) by dip coating under the condition of 23° C. and 42% relative humidity such that the total coating amount on the two surfaces of the porous substrate is 13.5 $g/m^2$, and immersed in a solution containing 50 vol % of a non-solvent, water, based on NMP for seconds, followed by coagulation and washing. Subsequently, drying is performed with hot air using 100° C. heat-gun to manufacture a separator. The porous coating layer of the separator has no interstitial volume, and the areas occupied by the solvent become pores by exchange between solvent and non-solvent.

Comparative Example 7

A separator having a porous coating layer is manufactured by the same method as comparative example 6 except that a binder polymer solution is prepared using P(VDF-HFP-CTFE)terpolymer (vinylidene fluoride-hexafluoropropylene-chlorotrifluoroethylene terpolymer) (weight average molecular weight: 500,000, containing 80 weight % of repeats unit derived from vinylidenefluoride, 1 weight % of repeats unit derived from hexafluoropropylene and 19 weight % of repeats unit derived from chlorotrifluoroethylene). The porous coating layer of the separator has no interstitial volume, and the areas occupied by the solvent become pores by exchange between solvent and non-solvent.

Comparative Example 8

P(VDF-HFP-CTFE)terpolymer (vinylidene fluoride-hexafluoropropylene-chlorotrifluoroethylene terpolymer) (weight average molecular weight: 500,000, containing 90 weight % of repeats unit derived from vinylidenefluoride, 5 weight % of repeats unit derived from hexafluoropropylene and 5 weight % of repeats unit derived from chlorotrifluoroethylene) is added to acetone and dissolved at 50° C. for about 4 hours to prepare a binder polymer solution. 500 nm $Al_2O_3$ powder and 250 nm γ-AlOOH powder as inorganic particles are mixed at a weight ratio of 9:1 and added to the binder polymer solution at a weight ratio of binder polymer: total inorganic particles=1:4. After a dispersant, cyanoethyl polyvinylalcohol, is added in an amount of 2 weight % of the total amount of inorganic particles, the inorganic particles are pulverized and dispersed using a ball mill method for 12 hours in total to prepare slurry for forming a porous coating layer. In this instance, a ratio of solvents and solids is 4:1. The slurry for forming a porous coating layer is coated on two surfaces of a 6 cm×15 cm polyethylene porous substrate (thickness 9 μm, porosity 43%, air permeation time 110 sec, resistance 0.45Ω) by dip coating under the condition of 23° C. and 10% relative humidity such that the total coating amount on the two surfaces of the porous substrate is 13.5 $g/m^2$ and dried at 23° C. for 1 minute to manufacture a separator. Some pores between adjacent inorganic particles of the separator are clogged by the binder, so the interstitial volumes are not uniformly formed.

Comparative Example 9

A separator having a porous coating layer is manufactured by the same method as example 1 except that a binder polymer solution is prepared using P(VDF-HFP-CTFE) terpolymer (vinylidene fluoride-hexafluoropropylene-chlorotrifluoroethylene terpolymer) (weight average molecular weight: 500,000, containing 66 weight % of repeats unit derived from vinylidenefluoride, 29 weight % of repeats unit derived from hexafluoropropylene and 5 weight % of repeats unit derived from chlorotrifluoroethylene).

Evaluation Example 1: Observation of Pore Shape in Porous Coating Layer

The surface or cross section of the separator may be confirmed by imaging using a scanning electron microscopy (SEM).

In detail, for each separator obtained in example 1 and comparative examples 1 to image processing is performed on the pores present in the range of view width 60 μm and a predetermined depth from the surface (for example, ⅕ to 1/100 of the thickness of the porous coating layer) to capture an image of the separator surface shape, and the results are shown in FIGS. 1a, 2a, 3a, 4a, 5a and 6a respectively.

Figure 1B:
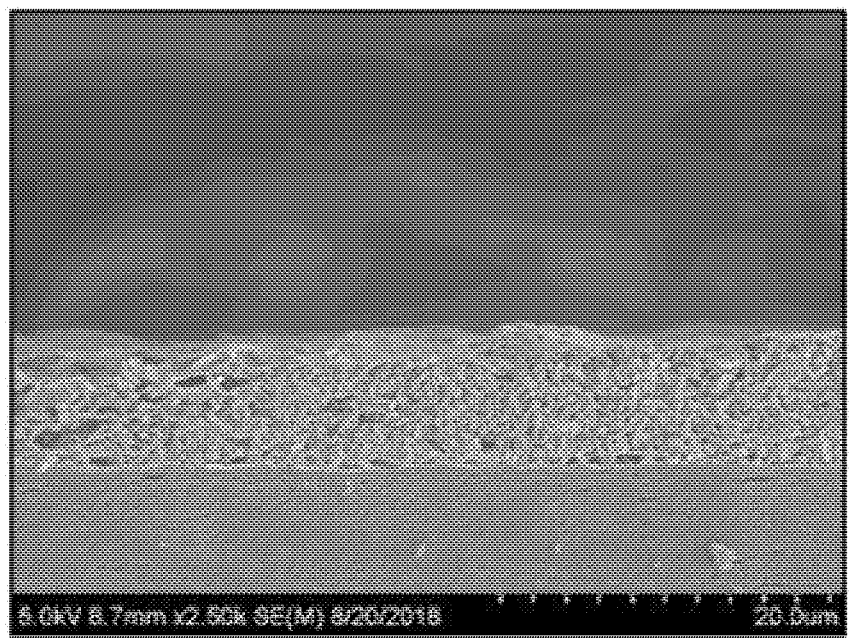
Figure 1C:
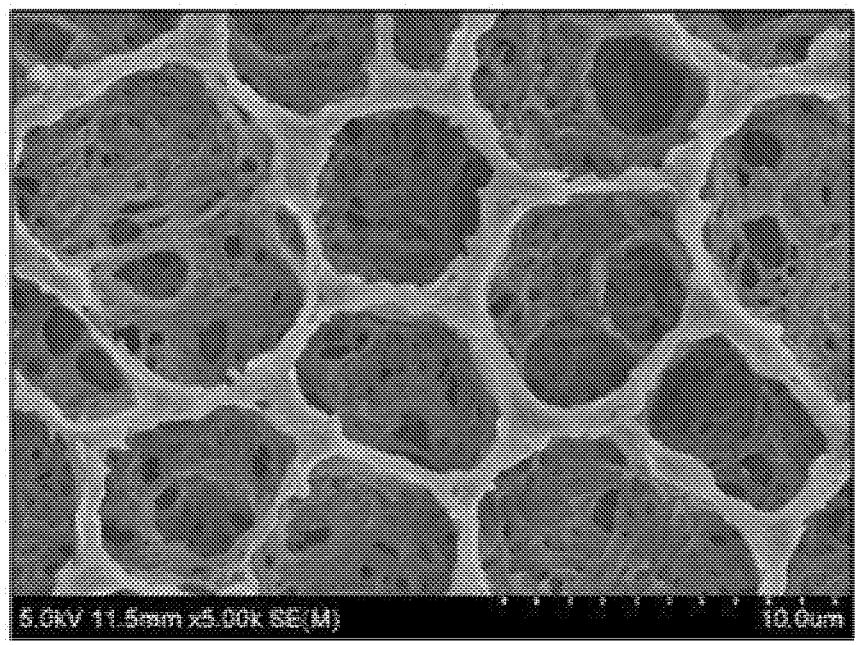
Figure 1D:
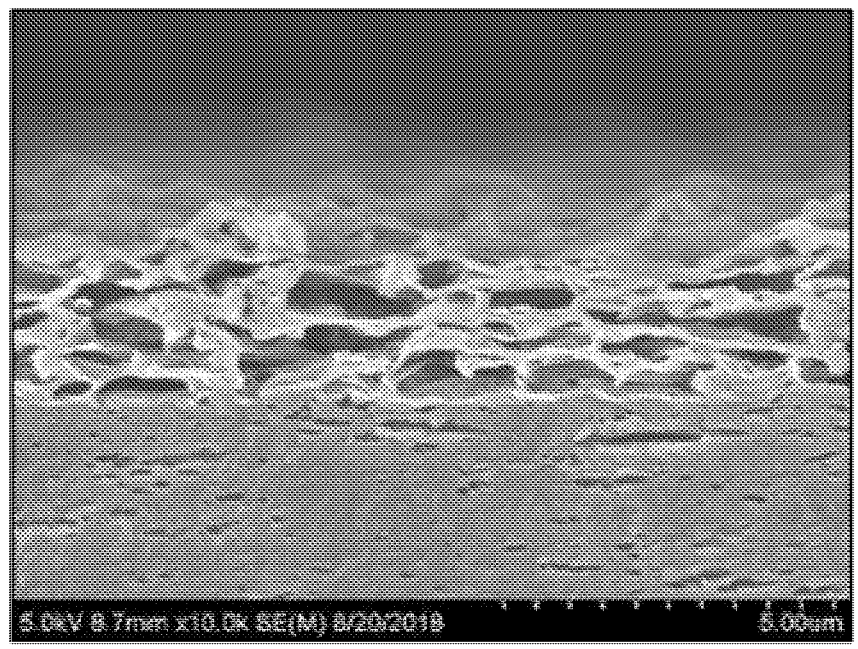
Figure 2A:
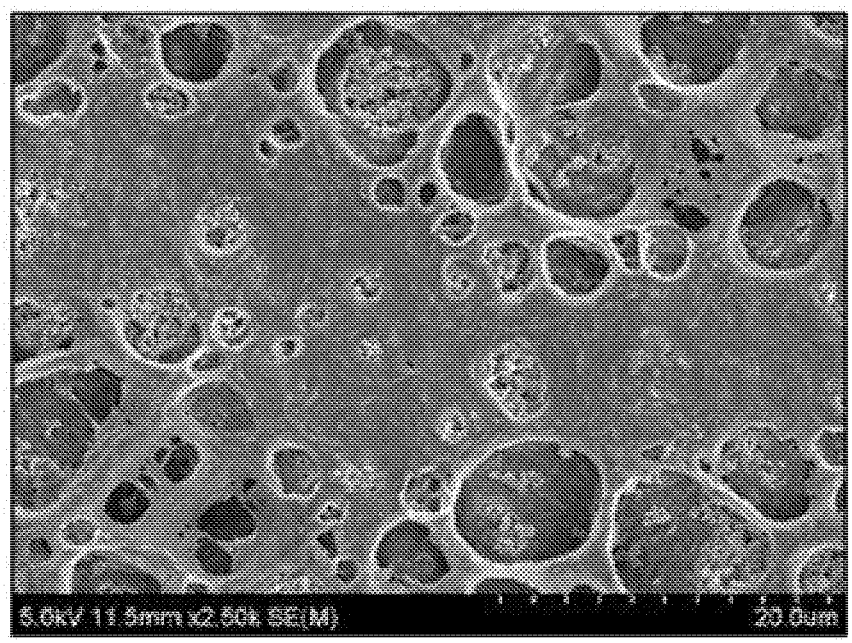
FIGS. 2a to 2d are SEM images respectively showing surface and cross section of comparative example 1 separator and surface and cross section of comparative reference example 1 separator.
Figure 2B:
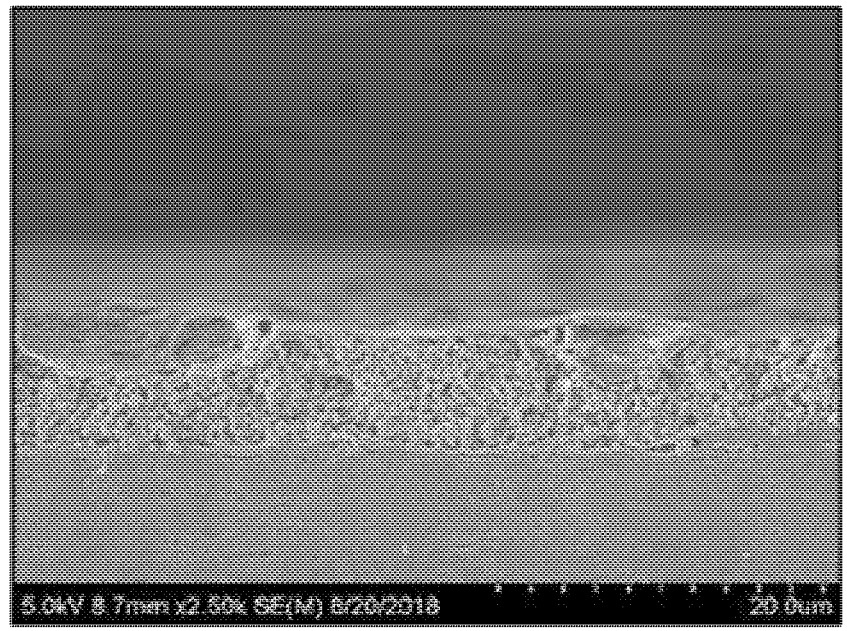
Figure 2C:
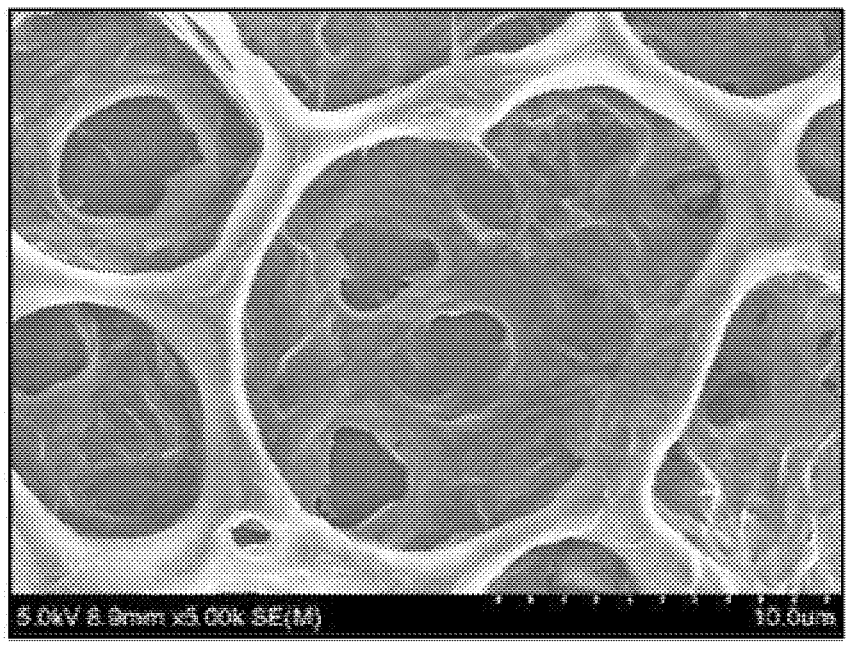
Figure 2D:
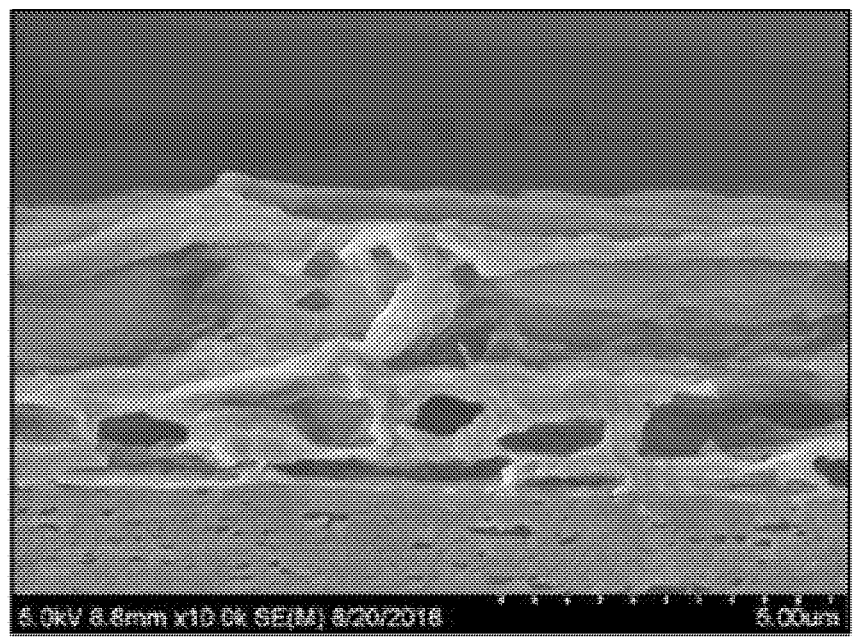
Figure 3A:
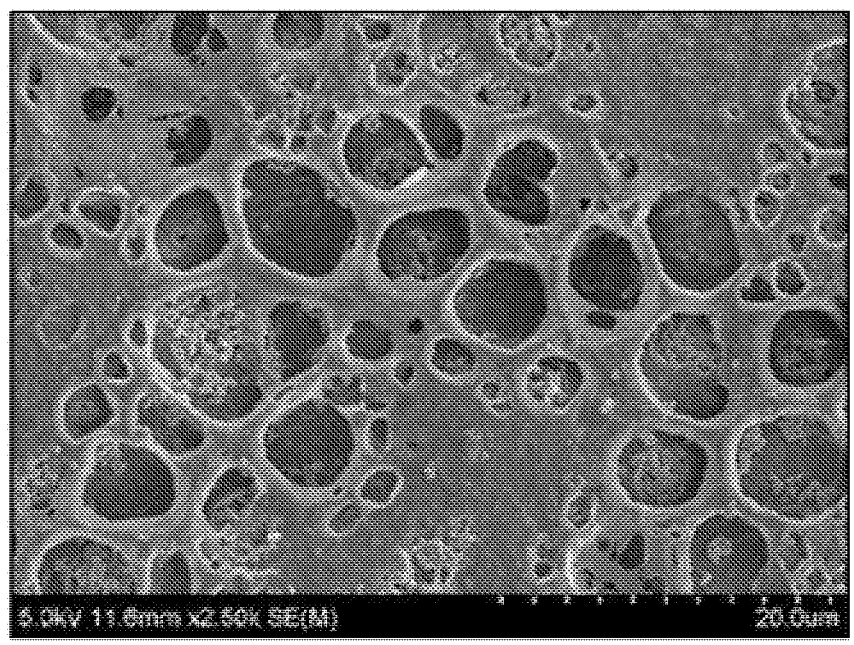
FIGS. 3a to 3c are SEM images respectively showing surface of comparative example 2 separator and surface and cross section of comparative reference example 2 separator.
Figure 3B:
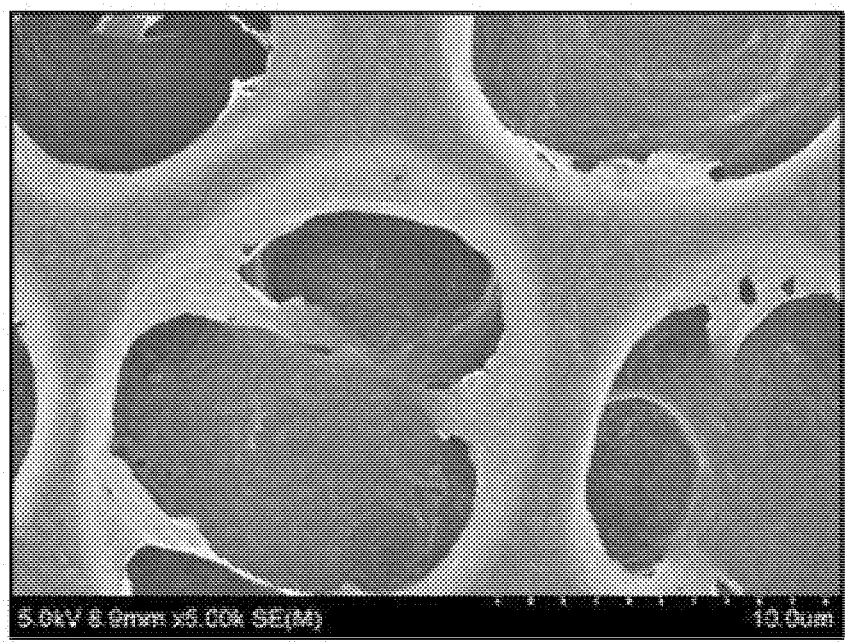
Figure 3C:
Figure 4A:
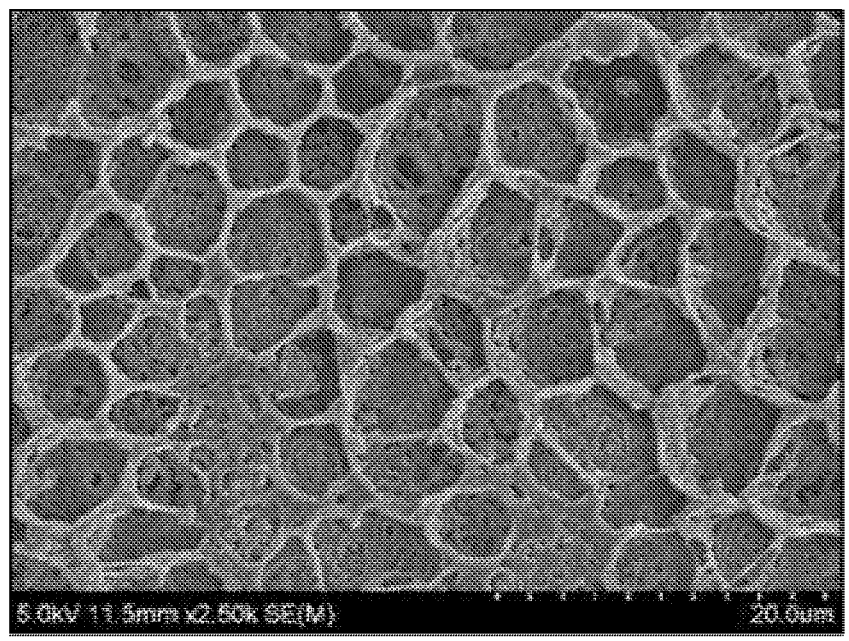
FIGS. 4a to 4c are SEM images respectively showing surface of comparative example 3 separator and surface and cross section of comparative reference example 3 separator.
Figure 4B:
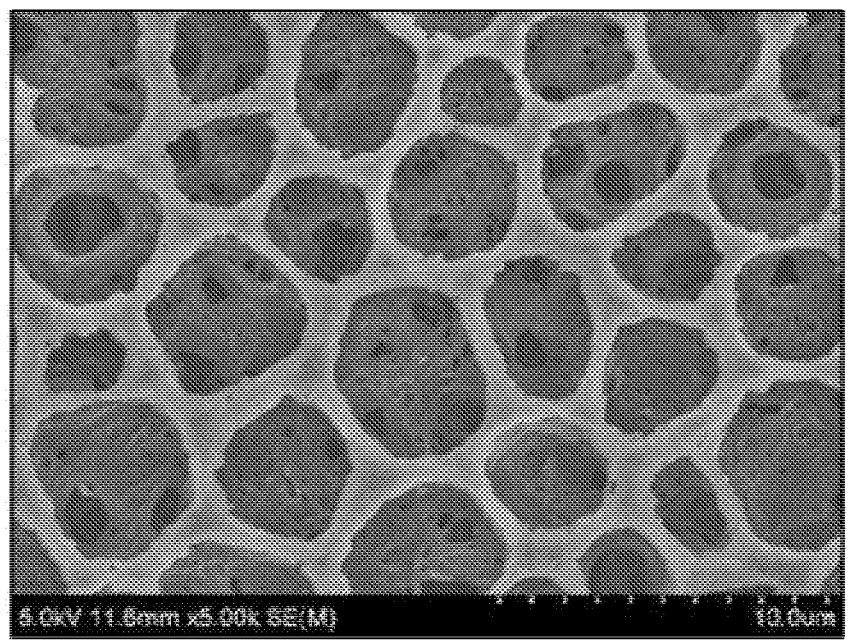
Figure 4C:
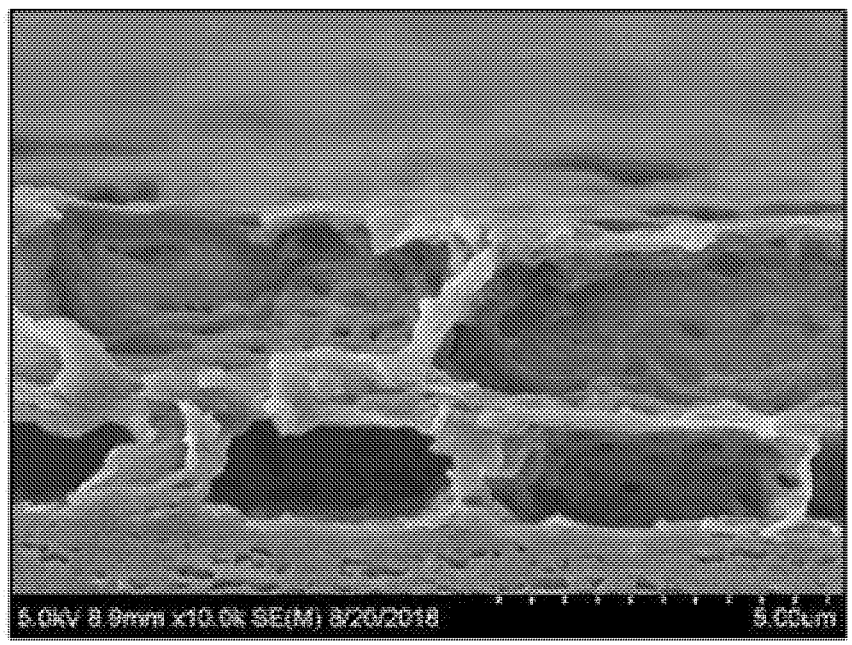
Figure 5A:
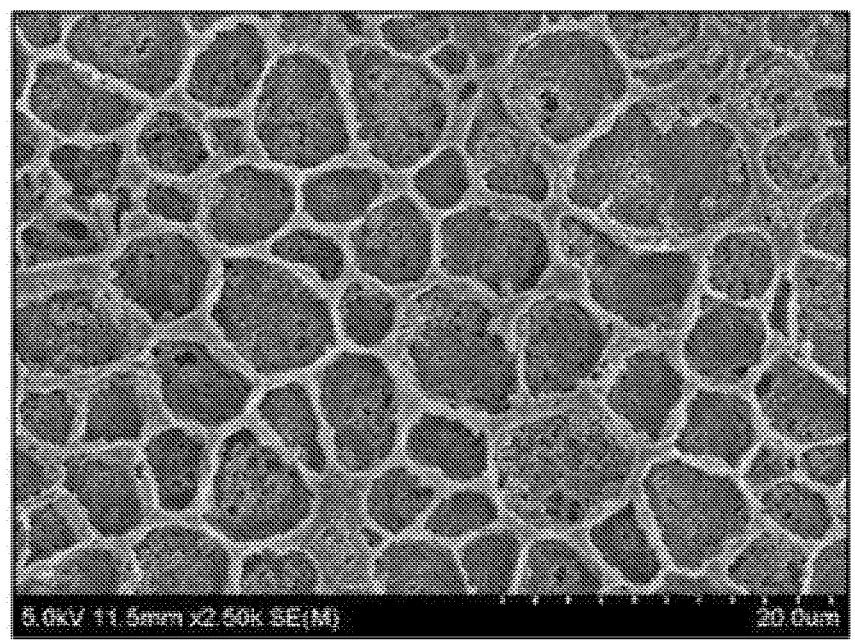
FIGS. 5a to 5c are SEM images respectively showing surface of comparative example 4 separator and surface and cross section of comparative reference example 4 separator.
Figure 5B:
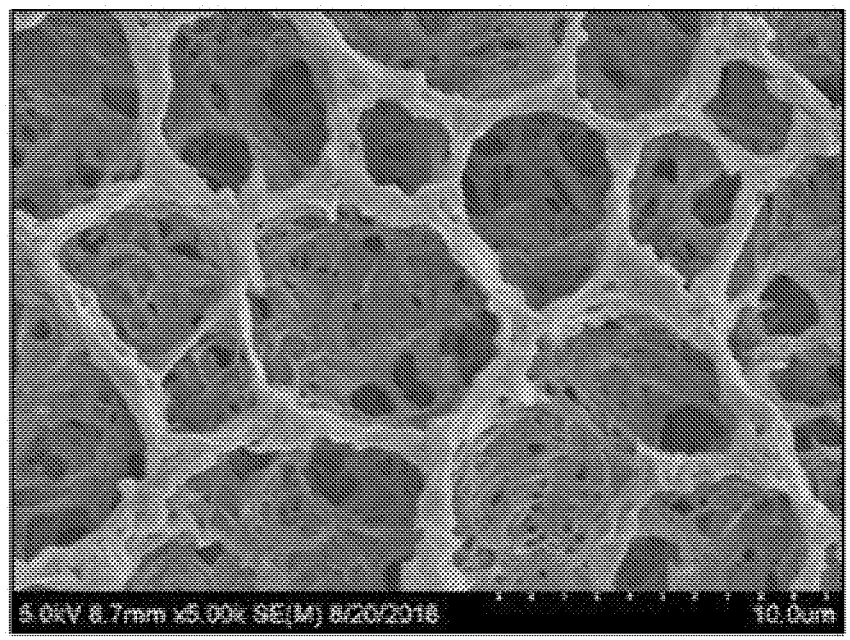
Figure 5C:
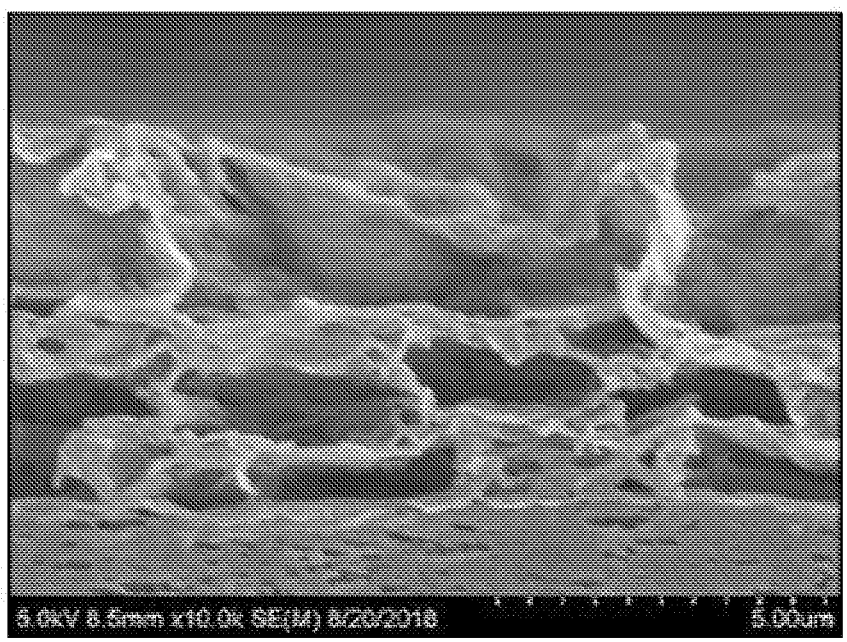
Figure 6A:
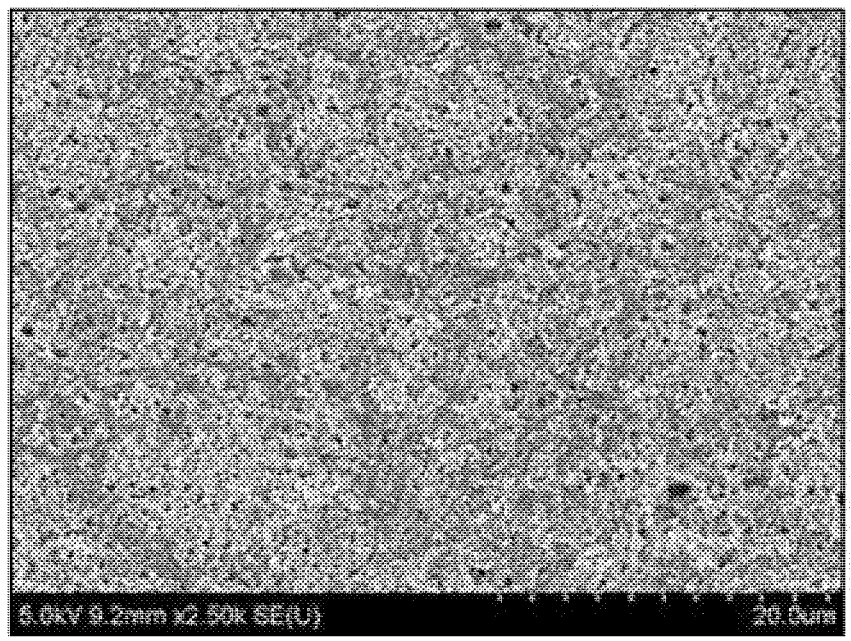
FIGS. 6a to 6c are SEM images respectively showing surface of comparative example 5 separator and surface and cross section of comparative reference example 5 separator.
Figure 6B:
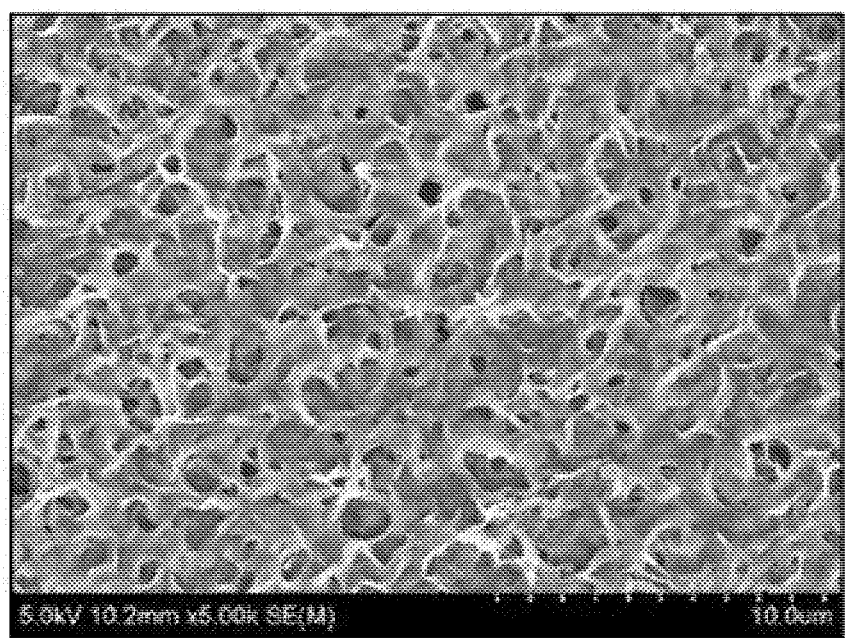
Figure 6C:

Additionally, in the same way as above, the cross-section shape of the separators obtained in example 1 and comparative example 1 is imaged, and the results are shown in FIGS. 1B and 2b.

Meanwhile, when the slurry including the inorganic particles is coated on the porous substrate and dried, the SEM image in cross section cannot show a difference in the pore shape according to the type of binder polymer. Accordingly, to clearly compare the pore shape according to the type of binder polymer, reference example 1 and comparative reference examples 1 to 5 provide separators manufactured by coating and drying a coating composition containing no inorganic particle, a binder polymer solution, on a porous substrate. For each separator, image processing is performed on the pores present in the range of view width 60 μm and a predetermined depth from the surface (for example, ⅕ to 1/100 of the thickness of the porous coating layer) to capture an image of the separator surface shape, and the results are shown in FIGS. 1c, 2c, 3b, 4b, 5b and 6b respectively. Additionally, cross-sectional images of the separators of reference example 1 and comparative reference examples 1 to 5 are shown in FIGS. 1d, 2d, 3c, 4c, 5c and 6c.

From the SEM images, it is found that example 1 and reference example 1 using PVDF-HFP-CTFE terpolymer binder polymer has uniform micropores. Particularly, it is found that in the case of the separator of example 1, the porous coating layer includes interstitial volumes between the inorganic particles corresponding to voids defined by substantial contact between adjacent inorganic particles.

In contrast, it can be seen that comparative example 1 and comparative reference example 1 using a combination of PVDF-HFP (HFP 15 wt %) and PVDF-CTFE (CTFE 20 wt %) as binder polymer have an irregular pore size. Additionally, it can be seen that comparative example 2 and comparative reference example 2 using PVDF-HFP (HFP 15 wt %) alone as binder polymer have a relatively large pore size, and comparative example 3 and comparative reference example 3 using PVDF-HFP (HFP 8 wt %) alone as binder polymer have also a relatively large pore size. Additionally, it can be seen that comparative example 4 using PVDF-CTFE (CTFE 20 wt %) alone as binder polymer fails to form appropriate pores since binder polymer precipitation occurs before internal pore formation due to the binder polymer being sensitive to phase separation.

Evaluation Example 2: Adhesiveness Towards Electrode Test

The separators manufactured in examples 1 to 5 and comparative examples 1 to 9 are tailored to the size of 25 mm×70 mm. The prepared separator and the anode are overlapped with each other, interposed between a 100 μm PET film, and adhered using a flat plate press. In this instance, the condition of the flat plate press is heat pressing at the temperature of 70° C. and the pressure of 600 kgf for 1 second. The separator and the anode adhered to each other are attached to a slide glass using a double-sided tape. Part of the separator adhesive surface (10 mm or less from the end of the adhesive surface) is peeled off and adhered such that its longitudinal direction is connected to a 25×100 mm PET film using a single sided tape. A force is applied 180° at 300 mm/min with the slide glass being placed on a lower holder of UTM instrument (LLOYD Instrument LF Plus) and the PET film attached to the separator being placed on an upper holder of the UTM instrument, and a force required to separate the separator from the anode is measured. The adhesiveness towards electrode is a value reflecting the adhesiveness level between the electrode and the coated separator, and the results are shown in FIG. 7.

Evaluation Example 3: Resistance Test of Separator

A resistance value when each separator of examples 1 to 5 and comparative examples 1 to 9 is cut and placed in Hoshen 2032 coin cell, and then impregnated with an electrolyte solution is measured by alternating current method with Electrochemical Impedance Spectroscopy (EIS) at 25° C. using 1M LiPF6-ethylene carbonate/ethylmethyl carbonate (a weight ratio of 3:7) electrolyte solution, and the results are shown in FIG. 7.

Evaluation Example 4: Air Permeation Time Test of Separator

In accordance with JIS P-8117, air permeability is measured using a Gurley type air permeability tester. In this instance, for each separator of examples 1 to 5 and comparative examples 1 to 9 having the diameter of 28.6 mm and the area of 645 mm², the time taken for 100 ml of air to pass through the separator is measured, and the results are shown in FIG. 7.

Evaluation Example 5: Thermal Shrinkage Test (MD/TD) of Separator

The separator samples obtained in each example or comparative example are cut to the size of 50 mm (length)×50 mm (width) to prepare a test piece. The test piece is kept in an oven heated to 150° C. for 30 minutes. Subsequently, the test piece is taken and its changed lengths in MD and TD are measured.

Shrinkage (%)={(dimension before contraction−dimension after contraction)/dimension before contraction}×100

Review of FIG. 7

From FIG. 7, it can be seen that the separators of examples 1 to 5 have the maximum air permeability of 688 sec/ml, and thus the air permeability is good or high. In contrast, it is found that the separators of comparative examples 1, 2, 8 and 9 have very poor air permeability of 1447 sec/ml or more.

Additionally, it is found that of the separators of examples 1 to 5 have good or excellent adhesiveness of 66 gf/24 mm or more towards negative electrode, and from this, it may be inferred that uniform micropores are formed on the surface of the separator of the present disclosure, and the separator has a wide specific surface area for contact with the electrode. In contrast, it is found that comparative example 3 has the porous coating layer separated from the substrate due to the low adhesiveness with the substrate, and the separators of comparative examples 4 to 9 have low adhesiveness of 24 gf/24 mm or less towards negative electrode.

Additionally, it is found that the separators of examples 1 to 5 have the resistance of 0.96 Ohm or less, whereas the separators of comparative examples 1 to 3, 8 and 9 have the resistance of 0.98 Ohm or more.

Additionally, it is found that the separators of examples 1 to 5 have MD thermal shrinkage of 17% or less and TD thermal shrinkage of 16% or less, whereas the separators of comparative examples 2 and 4 to 9 have MD thermal shrinkage of 19% or more and TD thermal shrinkage of 18% or more. Particularly, the separators of comparative example 6 to 8 including pores formed through phase transition and the separator of comparative example 9 having high HFP content in the terpolymer binder have high thermal shrinkage.

From the foregoing, it is found that when the binder polymer of the present disclosure including repeat units derived from VDF-HFP-CTFE is used in the porous coating layer, the separator has good air permeability, adhesiveness towards electrode, resistance characteristics and thermal shrinkage.

Evaluation Example 6 Evaluation of F:Cl Distribution Uniformity in Thickness Direction of Separator When the weight fraction of F (fluorine) and the weight fraction of Cl (chlorine) are indicated such that the sum of each weight fraction is 100, the distribution of F(fluorine):Cl(chlorine) in a surface region and a bottom region of the porous coating layer is evaluated from a value of "$|(a-b)/a \times 100|$", a conditional equation of the weight fraction (a) of Cl (chlorine) in the surface region of the porous coating layer and the weight fraction (b) of Cl (chlorine) in the bottom region of the porous coating layer. In this instance, the surface region is defined as a region extending downwards from the surface to the bottom by 10% of the total thickness of the porous coating layer, and the bottom region is defined as a region extending upwards from the bottom of the porous coating layer to the surface by 10% of the total thickness of the porous coating layer. In the conditional equation, when $0 \leq |(a-b)/a \times 100| \leq 100$, more preferably $0 \leq |(a-b)/a \times 100| \leq 50$, it may be determined that the binder polymer distribution is uniform along the thickness of the porous coating layer.

To this end, the thickness of the porous coating layer of the separators of reference example 1 and comparative reference example 1 is divided into five region, the surface region extending downwards from the surface to the bottom by 10% of the total thickness of the porous coating layer is designated as Spectrum 1, the region extending upwards from the bottom of the porous coating layer to the surface by 10% of the total thickness of the porous coating layer is designated as Spectrum 5, Spectrum 1 and Spectrum 5 are equally divided into three in the thickness direction, and the three divisions are designated as Spectrum 2, Spectrum 3 and Spectrum 4 in an ascending order from Spectrum 1.

The weight fraction of F (fluorine) and the weight fraction of Cl (chlorine) are determined by determining how much fluorine and chlorine are detected in the bottom region and the surface region of the separator cross section specimen having the porous coating layer using Energy Dispersive Spectrometer (EDS) attached to an electron microscope.

The results are presented in the following table 1.

TABLE 1

| | Reference example 1 | | | | | Comparative reference example 1 | | | | |
|---|---|---|---|---|---|---|---|---|---|---|
| | F (wt %) | Cl (wt %) | a | a − b | $|(a-b)/a \times 100|$ | F (wt %) | Cl (wt %) | a | a − b | $|(a-b)/a \times 100|$ |
| Spectrum 1 | 94.4 | 5.6 | 5.6 | −1.9 | 34 | 95 | 5 | 5 | −7.3 | 146 |
| Spectrum 2 | 95.7 | 4.3 | | | | 85.5 | 14.5 | | | |
| Spectrum 3 | 91.4 | 8.6 | | | | 70.7 | 29.3 | | | |
| Spectrum 4 | 93.2 | 6.8 | | | | 92 | 8 | | | |
| Spectrum 5 | 92.5 | 7.5 | | | | 87.7 | 12.3 | | | |

According to the above Table 1, it can be seen that the Cl (chlorine) content in the surface region and the bottom region of the porous coating layer of reference example 1 is 34, showing uniform Cl (chlorine) distribution, namely uniform binder polymer distribution along the thickness of the porous coating layer, whereas the Cl (chlorine) content in the surface region and the bottom region of the porous coating layer of comparative reference example 1 amounts to 150, showing non-uniform Cl (chlorine) distribution, namely non-uniform binder polymer distribution along the thickness of the porous coating layer.

What is claimed is:

1. A separator for a lithium secondary battery, comprising:
a porous substrate; and
a porous coating layer disposed on at least one surface of the porous substrate and comprising inorganic particles and a binder polymer,
wherein the binder polymer comprises a terpolymer including a repeat unit derived from vinylidenefluoride (VDF), a repeat unit derived from hexafluoropropylene (HFP) and a repeat unit derived from chlorotrifluoroethylene (CTFE),
the terpolymer includes 65 to 90 weight % of the repeat unit derived from VDF, 1 to 28 weight % of the repeat unit derived from HFP and 5 to 28 weight % of the repeat unit derived from CTFE with respect to a total amount of the terpolymer, and the separator for a lithium secondary battery has adhesiveness ranging from 30 gf/25 mm to 150 gf/25 mm and machine direction (MD) thermal shrinkage of 1 to 18% and transverse direction (TD) thermal shrinkage of 1 to 17%, wherein when a weight fraction of F (fluorine) and a weight fraction of Cl (chlorine) are indicated such that a sum of the weight fraction of F and the weight fraction of Cl is 100, the weight fraction (a) of Cl (chlorine) in a surface region of the porous coating layer and the weight fraction (b) of Cl (chlorine) in a bottom region of the porous coating layer satisfy the following formula:

$$0 \leq |(a-b)/a \times 100| \leq 100$$

wherein the surface region is a region extending downwards from a surface to a bottom by 10% of the total thickness of the porous coating layer, and the bottom region is a region extending upwards from the bottom of the porous coating layer to the surface by 10% of the total thickness of the porous coating layer.

2. The separator for a lithium secondary battery according to claim 1, wherein the terpolymer includes 65 to 90 weight % of the repeat unit derived from vinylidenefluoride (VDF), 1 to 20 weight % of the repeat unit derived from hexafluoropropylene (HFP) and 7 to 28 weight % of the repeat unit derived from chlorotrifluoroethylene (CTFE) with respect to the total amount of the terpolymer.

3. The separator for a lithium secondary battery according to claim 1, wherein the terpolymer includes 70 to 85 weight % of the repeat unit derived from vinylidenefluoride (VDF), 1 to 5 weight % of the repeat unit derived from hexafluoropropylene (HFP) and 7 to 28 weight % of the repeat unit derived from chlorotrifluoroethylene (CTFE) with respect to the total amount of the terpolymer.

4. The separator for a lithium secondary battery according to claim 1, wherein the terpolymer has a weight average molecular weight of 200,000 to 1,000,000.

5. The separator for a lithium secondary battery according to claim 1, wherein when a weight fraction of F (fluorine) and a weight fraction of Cl (chlorine) are indicated such that a sum of each weight fraction is 100, the weight fraction (a) of Cl (chlorine) in the surface region of the porous coating layer and the weight fraction (b) of Cl (chlorine) in the bottom region of the porous coating layer satisfy the following formula:

$$0 \leq |(a-b)/a \times 100| \leq 50.$$

6. The separator for a lithium secondary battery according to claim 1, wherein the porous coating layer further comprises an additional binder polymer, a dispersant, or a combination thereof.

7. The separator for a lithium secondary battery according to claim 6, wherein the additional binder polymer is comprises one selected from the group consisting of vinylidenefluoride derived binary copolymer, polymethylmethacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, acrylonitrile-styrene-butadiene copolymer and polyimide, and a combination thereof.

8. The separator for a lithium secondary battery according to claim 1, wherein the separator for a lithium secondary battery has 1.3 to 7.0 times higher air permeability than that of the porous substrate.

9. A lithium secondary battery comprising a positive electrode and a negative electrode and a separator interposed between the positive electrode and the negative electrode, wherein the separator is the separator for a lithium secondary battery according to claim 1.

10. The separator for a lithium secondary battery according to claim 1, wherein the inorganic particles include $BaTiO_3$, Pb$(Zr,Ti)O_3$ (PZT), $Pb_{1-x}La_xZr_{1-y}Ti_yO_3$ (PLZT, $0<x<1$, $(<y<1)$, Pb $(Mg_{1/3}Nb_{2/3})$ $O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $\gamma$-AlOOH, SiC, $TiO_2$, and combinations thereof.

11. The separator for a lithium secondary battery according to claim 1, wherein the inorganic particles include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)$ 3, $0<x<2$, $0<y<1$, $0<z<3$), (LiAl-TiP)$_xO_y$ based glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$) such as $Li_3N$, etc., $SiS_2$ based glass ($Li_xSi_yS_z$, $0<x<3$, $0<y<2$, $0<z<4$), $P_2S_5$ based glass ($Li_xP_yS_z$, $0<x<3$, $0<y<3$, $0<z<7$) and combinations thereof.

12. The separator for a lithium secondary battery according to claim 1, wherein the terpolymer is present in an amount of 3 to 100 parts by weight based on 100 parts by weight of the inorganic particles.

13. The separator for a lithium secondary battery according to claim 1, wherein the terpolymer is present in an amount of 3 to 70 parts by weight based on 100 parts by weight of the inorganic particles.

14. The separator for a lithium secondary battery according to claim 1, wherein the terpolymer is present in an amount of 5 to 45 parts by weight based on 100 parts by weight of the inorganic particles.

15. The separator for a lithium secondary battery according to claim 1, wherein a pore size of the porous coating layer is in a rage from 0.001 to 10 μm.

16. The separator for a lithium secondary battery according to claim 1, wherein a pore size of the porous coating layer is in a rage from 0.001 to 1 μm.

* * * * *